(12) United States Patent
Loiseau et al.

(10) Patent No.: US 7,623,604 B2
(45) Date of Patent: Nov. 24, 2009

(54) SUPPRESSING INTERFERENCE FOR WIRELESS RECEPTION AND IMPROVEMENTS RELATING TO PROCESSING A FREQUENCY SHIFT KEYED SIGNAL

(75) Inventors: Philippe Loiseau, La Roquette sur Siagne (FR); Michel Gaeta, La Valette du Var (FR); Luc Haumonte, Grasse (FR)

(73) Assignee: IMRA Europe S.A., Sophia Antipolis Cedex (FR)

( * ) Notice: Subject to any disclaimer, the term of this patent is extended or adjusted under 35 U.S.C. 154(b) by 828 days.

(21) Appl. No.: 11/374,306

(22) Filed: Jun. 29, 2004

(65) Prior Publication Data

US 2007/0201588 A1    Aug. 30, 2007

Related U.S. Application Data

(63) Continuation of application No. 10/697,483, filed on Oct. 30, 2003, now abandoned.

(30) Foreign Application Priority Data

| Oct. 31, 2002 | (FR) | ............................. | 02 13649 |
| Oct. 31, 2002 | (FR) | ............................. | 02 13650 |
| Mar. 19, 2003 | (FR) | ............................. | 03 03367 |
| Aug. 29, 2003 | (FR) | ............................. | 03 10323 |

(51) Int. Cl.
    H04B 1/10    (2006.01)
(52) U.S. Cl. .................. 375/350; 375/261; 375/271; 375/272; 375/278; 375/284; 375/285

(58) Field of Classification Search ................. 375/350, 375/261, 271, 272, 278, 284, 285; 455/257
See application file for complete search history.

(56) References Cited

U.S. PATENT DOCUMENTS 4,518,922 A    5/1985    Luecke ....................... 329/302

(Continued)

FOREIGN PATENT DOCUMENTS

| EP | 0831595 A3 | 9/1997 |
| JP | 11-215036 | 6/1999 |

*Primary Examiner*—Shuwang Liu
*Assistant Examiner*—Kabir A Timory
(74) *Attorney, Agent, or Firm*—Christopher P. Maiorana, PC

(57) ABSTRACT

A communications receiver may include an adaptive filter unit for removing coherent interference components from a received signal. In the absence of a signal of interest, the filter may adapt dynamically to remove current interference components. When a signal of interest is detected, the filter may be controlled to stop (or at least reduce) its adaptation, to prevent removal of the signal of interest. The received signal may be down-converted to a complex baseband by conditioning circuitry. A detector may detect the signal of interest, and control the filter. Autocorrelation may be used to estimate a characteristic of the signal of interest in the complex baseband. The detector may include hysteresis to react quickly to the start of signal of interest, and more slowly to an end of the signal of interest. The signal of interest may be a frequency shift keyed (FSK) signal. A demodulator may demodulate FSK components based on the autocorrelation result. The characteristic of the signal of interest used for detection and/or demodulation may be a directional characteristic of a vector representing the complex baseband signal in complex space.

36 Claims, 14 Drawing Sheets

U.S. PATENT DOCUMENTS

| | | | |
|---|---|---|---|
| 4,612,509 A | 9/1986 | Betts et al. | 329/302 |
| 4,647,864 A | 3/1987 | Rafferty et al. | 329/302 |
| 5,040,192 A | 8/1991 | Tjahjadi | |
| 5,229,998 A | 7/1993 | Weisser | 370/517 |
| 5,243,299 A | 9/1993 | Marchetto et al. | |
| 5,259,030 A | 11/1993 | Francis | 375/346 |
| 5,550,505 A | 8/1996 | Gaus, Jr. | 329/300 |
| 5,729,576 A | 3/1998 | Burns et al. | |
| 5,748,036 A | 5/1998 | Lee et al. | 329/300 |
| 5,953,380 A | 9/1999 | Ikeda | 375/346 |
| 5,963,597 A * | 10/1999 | Okawa | 375/261 |
| 5,995,567 A | 11/1999 | Cioffi et al. | |
| 6,272,184 B1 | 8/2001 | Ta et al. | 375/334 |
| 6,813,482 B1 * | 11/2004 | Nakano | 455/257 |
| 6,961,423 B2 * | 11/2005 | Pessoa et al. | 379/406.08 |
| 7,181,085 B1 * | 2/2007 | Despain | 382/261 |
| 2001/0006511 A1 * | 7/2001 | Matt | 370/286 |
| 2002/0196876 A1 * | 12/2002 | Takada | 375/346 |
| 2003/0007272 A1 * | 1/2003 | Jibry | 360/46 |
| 2003/0235312 A1 * | 12/2003 | Pessoa et al. | 381/66 |
| 2006/0152276 A1 * | 7/2006 | Barksdale | 329/315 |

* cited by examiner

| | |
|---|---|
| $\tilde{N}(t) = \sum_{u=0}^{m} b_u^*(t) S_{CFD}(t-\Delta-u) = \vec{B}^T(t)\vec{N}(t)$ $\tilde{S}(t) = \sum_{i=0}^{n} a_i^*(t) S_{CFD}(t-i) = \vec{A}^T(t)\vec{S}(t)$ | Filtering step |
| $S_{CFDJ}(t) = \tilde{S}(t) - \tilde{N}(t)$ | Jammer subtraction |
| $power(t+1) = power(t) + \mu_{power}\left(S_{CFD}(t+1)S_{CFD}^*(t+1) - power(t)\right)$ | Signal power update |
| $\partial = \frac{\alpha}{power(t)} S_{ON/OFF}(t)$ | Updating factor normalization and learning management |
| $\vec{B}(t+1) = \vec{B}(t) - \partial \vec{N}(t+1)e^*(t+1)$ $\vec{A}(t+1) = \vec{A}(t) + \partial \vec{S}(t)e^*(t+1)$ with $\vec{B}(t) = [b_0(t)\ b_1(t)\ ...b_m(t)]$ colon vector $\vec{A}(t) = [1\ a_1(t)\ ...a_n(t)]$ colon vector $\vec{S}(t) = [S_{CFD}(t)\ S_{CFD}(t-1)\ S_{CFD}(t-n)]$ colon vector $\vec{N}(t) = [S_{CFD}(t-\Delta)\ S_{CFD}(t-\Delta-1)\ S_{CFD}(t-\Delta-m)]$ colon vector | Filter coefficients update |

FIG. 12

SUPPRESSING INTERFERENCE FOR WIRELESS RECEPTION AND IMPROVEMENTS RELATING TO PROCESSING A FREQUENCY SHIFT KEYED SIGNAL

This is a continuation of U.S. Ser. No. 10/697,483, filed Oct. 30, 2003 now abandoned, which claims the benefit of France Application No. FR02 13649, filed Oct. 31, 2002; France Application No. FR02 13650, filed Oct. 31, 2002; France Application No. FR03 03367, filed Mar. 19, 2003; and France Application No. FR03 10323, filed Aug. 29, 2003.

FIELD OF THE INVENTION

The present invention relates to techniques for use in processing a received communications signal. The invention may be especially suitable for a processing a wirelessly received signal (for example, a remote locking/unlocking signal for a vehicle or vehicle alarm), but the invention is not limited to a wireless environment. One aspect of the invention may relate to suppressing the effects of interference in a received signal. Another aspect of the invention may relate to a technique for processing and demodulating a signal coded by frequency shift keying (FSK) modulation.

BACKGROUND TO THE INVENTION

In FSK modulation, bits or sequences of bits are represented by signals of at least two different frequencies. Due to technical constraints, the modulation properties are not always stable in time. For example, modulation properties may be affected by temperature variations, power supply variations, component tolerances, and relative motion between the transmitter and receiver. Particularly in the case of, for example, a vehicle security system, the transmitter is typically mounted in a small key fob or key handle, and is a low-cost (poor tolerance) miniature circuit, supplied by a miniature battery. With such a transmitter, it is difficult to control precisely the frequencies that will be generated by the transmitter. The frequencies may also wander during a single transmission. Also, the times at which the FSK signals will be transmitted may be unknown at the receiver.

Non-coherent techniques are known for demodulating such unpredictable FSK signals. However, as well as having a high computational overhead, conventional non-coherent techniques are highly vulnerable to the effects of interference from other signals in the same frequency range as the FSK signals of interest. Non-coherent techniques may be particularly affected by coherent interference in the form of one or more relatively stable interfering frequencies. Such coherent interference is often generated by electric lighting or by electronic equipment, for example, digital circuits having a stable clock frequency. In a vehicle environment, there are many independent circuits that may provide close-frequency interference.

Techniques are known for suppressing the effects of noise and interference. However, the more effective of these techniques rely on a reference source of the noise or interference to be suppressed. For example, the reference source may be a second receiver at a different location from a first receiver to provide a spatially different received signal. However, such a second receiver adds significant cost, and is often highly inconvenient to implement. The reference source may alternatively be in the form of a pre-programmed signal generator or mathematical model. However, the use of a pre-programmed reference assumes advance knowledge of the interference. Also, a pre-programmable reference is not adaptable to changing conditions nor even to a range of different conditions.

In summary, there remain many significant problems in providing a technique which is able to operate with conventional poor tolerance transmitters, and which can provide efficient, low cost and yet robust, processing and demodulation of FSK signals, and also provide relatively high immunity to close-frequency interference.

SUMMARY OF THE INVENTION

A first aspect of the invention may relate to suppressing interference in a received communications signal. The first aspect may generally include filtering the received signal using an adaptive filter. The adaptability of the filter may be controlled in accordance with whether a signal of interest is detected.

For example, when no signal of interest is detected, the filter may be operated in an adaptive (or highly adaptive) mode to adaptively remove components from the received signal. When a signal of interest is detected, the filter may be operated in a non-adaptive (or at least less adaptive) mode, such that the filter characteristics may be "frozen" (or be at least close to) that just before the signal of interest was detected.

Such a technique can provide for highly efficient and adaptive removal of any interference, which has coherence longer in duration than the signal of interest. Prior to a signal of interest being detected, the filter can adaptively remove any received signal components. Once a signal of interest is detected, the filter characteristic is held such that it may continue to remove the previous signal components (on the assumption that these previous signal components continue to be present), but the filter does not adapt to remove the signal of interest.

The signal of interest may be detected upstream or downstream of the adaptive filter. In the preferred embodiment, a detector is implemented after the filtering. The detector has a response faster than the adaptive response of the filter. Therefore, the detector is able to detect the presence of a signal of interest, and to change the mode of the filter, before the filter is able to react adaptively to remove the signal of interest from the received signal.

The filter may be a subtraction filter for removing from the received signal one or more components derived from a reference signal. The reference signal may be derived from the received signal. The reference signal may be a time-delayed signal derived from the received signal. The filter may be of the Weiner type.

The above first aspect of the invention may be especially suitable for, but is not limited to, use with an FSK modulated signal. However, the first aspect may be used with any type of modulation or information coding, to remove interference existing before the signal of interest is detected.

A second aspect of the invention may relate to a technique for processing and/or non-coherently demodulating and/or detecting an FSK signal. The second aspect may generally include down-converting the signal in frequency to a complex baseband centered at, or at least close to, zero frequency, and discriminating between a first frequency component and a second frequency component within the complex baseband. The discrimination may be based on a directional characteristic of a vector representing a signal in complex space. Of the FSK frequencies, a first upper frequency may have a first directional characteristic in complex space, and a second lower frequency may have a second directional characteristic different from the first directional characteristic. The directional characteristic may be referred to herein as the polarization.

The directional characteristic may be a quantized angle of the vector. The quantization may be a unit of 360 degrees divided by N, where N is an integer greater than 1. For example, the quantization may be a unit of 180 degrees. The quantization may correspond to a sign of the imaginary portion of the complex signal. The quantization may be calculated as the sign of the imaginary portion. In another example, the quantization may be a unit of 90 degrees for improved demodulation robustness. The quantization may correspond to signs of the real and imaginary portions of the complex signal. The quantization may be calculated as the signs of the real and imaginary portions. In another example, N may be 8 or 12, such that the trigonometric circle is divided into a number of narrower indexes or bands for even greater refinement of demodulation, and improved robustness to frequency wandering.

The above technique may divide a trigonometric circle into a number N of indexes or bands, for discriminating between different FSK frequencies. Detection of a jump of the complex signal from one index to another corresponds to detection of a jump between FSK frequencies in the received signal.

The polarization in the complex baseband may be determined based on an estimate using an autocorrelation function. In the presence of one of the stable FSK tones, the polarization should consistently tend towards a stable value, and be detectable by correlation. Autocorrelation of the autocorrelation (i.e. second degree autocorrelation) may also be used to detect coherence in the autocorrelation for identifying start and end points of the FSK message. FSK rules, such as a maximum interval between tone toggling, may also be applied to determine whether or not a detected signal corresponds to valid FSK.

In one form, a detection signal is generated in response to a signal of interest. The detection signal is generated with hysteresis to have a rapid response to detect the beginning of a signal of interest, and a slower response to detect the end of the signal of interest. The detection signal may be generated by combining two detection signals, the first providing the rapid response (at least for the beginning of the signal of interest), and the second providing a slower response. Such hysteresis can enable the beginning of the signal of interest to be detected quickly (for example to be sure to detect the first bit of the FSK message), without risking detection errors resulting from a discontinuity each time the FSK tones toggle. Such discontinuities might otherwise result in false detection of an end of the signal of interest.

Preferably, the received signal is further processed to remove interference signals that might affect the processing based on the polarization of the signal in the complex baseband.

A further aspect of the invention may generally relate to an efficient architecture for processing a received modulated communications signal. The architecture may generally provide a system or method for:

(a) converting the received communications signal to a complex baseband signal;
(b) adaptively filtering the complex baseband signal to remove coherent interference therefrom; and
(c) processing the filtered complex baseband signal to recognize a signal of interest, and to demodulate a message therefrom.

The processing may include controlling a characteristic for the adaptive filtering, as discussed, for example, in the first aspect of the invention. The processing may use an autocorrelation function to estimate a characteristic of the complex baseband signal. The characteristic may be a directional characteristic (polarization) of a vector representing the complex baseband signal in complex space. The processing may further include demodulating the signal based on the estimated characteristic. The processing may further include detecting the presence of a signal of interest in the complex baseband signal based on the estimated characteristic.

Other features, aspects and advantages of the invention will be apparent from the following description of preferred embodiments.

BRIEF DESCRIPTION OF THE DRAWINGS

A preferred and non-limiting embodiment of the invention is now described, by way of example only, with reference to the accompanying drawings, in which:

FIG. 12 is a schematic table listing the mathematical stages of the interference removal filter;

DETAILED DESCRIPTION OF PREFERRED EMBODIMENTS

Figure 1:
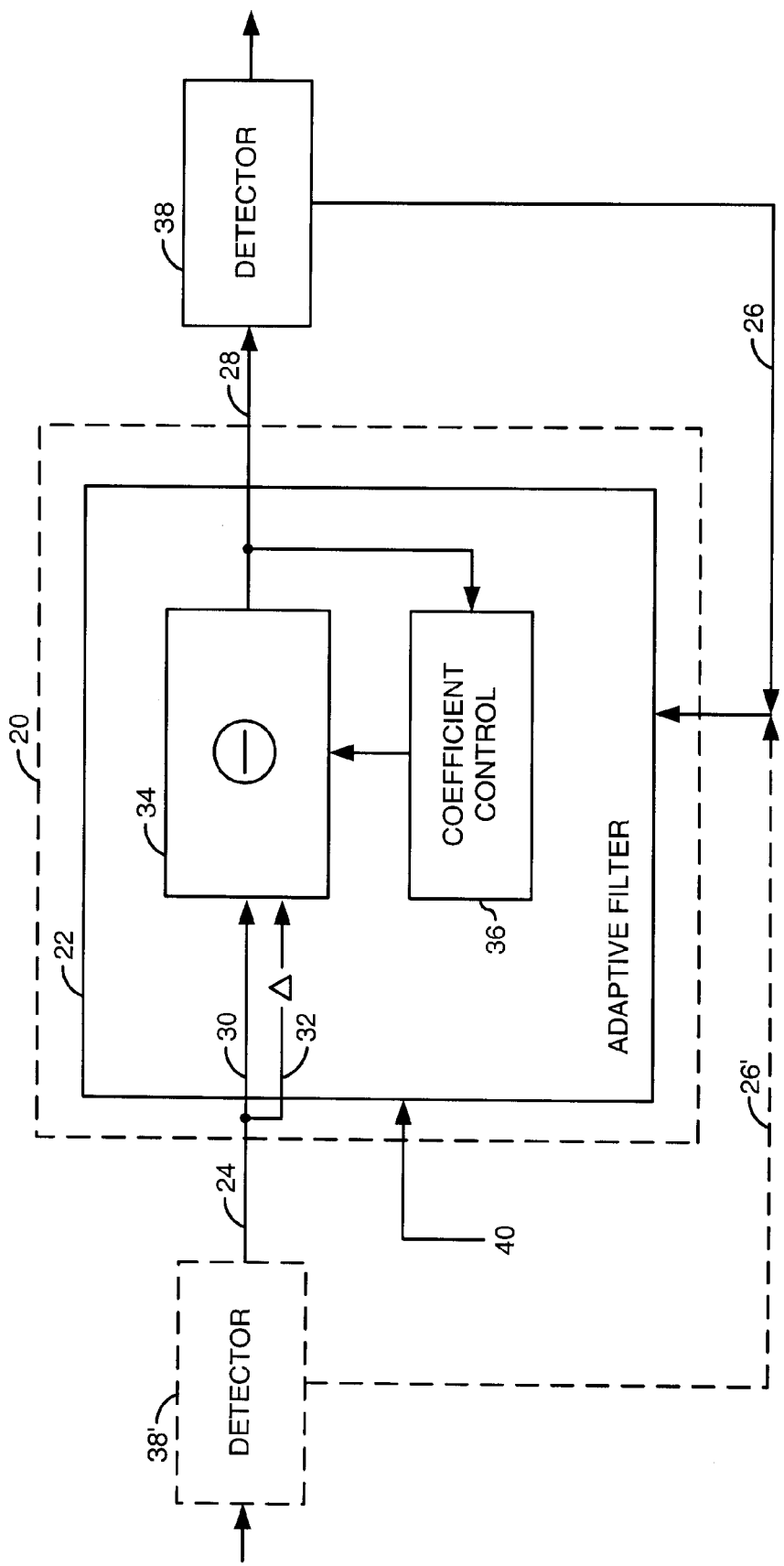
FIG. 1 is a schematic diagram showing the principles of an optional interference suppressor.

Before describing the entire preferred embodiments in detail, the principles of an optional interference suppressor 20 are firstly briefly described with reference to FIGS. 1 and 2. The interference suppressor 20 generally comprises an adaptive filter 22 receiving an input signal 24 and a control signal 26, and generating an output signal 28. The input signal may be a received signal, or a frequency shifted signal. By way of example, the adaptive filter 22 may be of a subtraction type, for example, a wiener filter. The filter 22 may be implemented digitally, and may operate in a sampling environment to process a sequence of digitized signal samples. The filter 22 may include a first signal path 30, a second signal path 32 including a delay, and a subtractor 34, for subtractively combining components of the signals from the first and second signal paths 30 and 32, according to filter coefficients. The second (delayed) signal path 32 may provide a reference signal having a certain phase relationship for coherent signals with respect to the first signal path 30. The filter 22 may further include a coefficient estimator 36 responsive to the output signal 28 for dynamically updating the filter coefficients to tend towards removing all coherent components of the signal at the output 28. A detailed example of the wiener filter is described later, although it will be appreciated that the following principles may be applied to any adaptive filter.

The control input 26 controls whether the filter 22 is in an adaptive mode in which the estimator 36 is operative to update the coefficients, or whether the filter 22 is in a non-adaptive mode in which the estimator 36 is inoperative, and/or the filter coefficients are "frozen" at their last updated values. Depending on the particular implementation, the control signal may be a binary signal, and one state (either asserted or deasserted) may indicate the adaptive mode, and the other state (either deasserted or asserted, respectively) may indicate the non-adaptive or frozen mode. The control signal 26 is generated by a detector 38 for detecting the presence of a signal of interest in the input signal. Prior to a signal of interest being detected, the adaptive filter 22 is operative in its adaptive mode such that all coherent components of the input signal 24 are actively cancelled. The estimator 36 continuously updates the filter coefficients to compensate for any variation, creation or disappearance of coherent components. When a signal of interest is detected, the detector 38 switches the control signal 26 to freeze the filter coefficients. The filter is therefore effective to continue to subtract all of the previous coherent components, but is prevented from adaptively removing the new signal of interest. When the signal of interest is no longer detected, the detector may again switch the control signal 26 to switch the filter 22 back to its adaptive mode.

The detector 38 may be positioned downstream of the adaptive filter 22 (as illustrated in this preferred example), or upstream of the adaptive filter 22 (as illustrated in phantom at 38'). The detector 38 may have a faster response than the adaptation response of the filter 22, preferably to ensure that the detector 38 is able to switch the filter 22 to its non-adaptive mode before the filter 22 adapts to substantially cancel components corresponding to the new signal of interest, from the input signal 24. In the present example, the detector 38 is located downstream of the adaptive filter 22, to benefit from the interference suppression provided by the adaptive filter 22.

The suppressor 20 may be operative continuously, or it may be operative at periodic intervals, for example, if the circuitry containing the suppressor 20 is operative in a low power, periodically activated, state. For example, a low power, periodically activated state may be used for vehicle applications where the circuit is powered from a battery. In such a state, it is preferred that the filter 22 has an adaptation response time less than the duration for which the circuitry is activated on each activation cycle. Such a response time can enable the filter 22 to adaptively remove new interference detected at the beginning of an activation cycle. For example, the filter may have an adaptation response time less than about one tenth of the duration for which the circuitry is activated.

Depending on the nature of the filter 22, even if there are no interference signals in the input signal 24, it may be desirable to add at least one artificial interference signal (depicted schematically at 40), to ensure that at least one interference signal exists to which the filter 22 will always be adapted. This can ensure that the filter 22 does not have a purely random set of coefficients, which might occur if no signals are present to which the filter is adapted. A potential risk with random coefficients is that the coefficients might coincidentally correspond to the frequency of the signal of interest, such that the signal of interest might be removed immediately or very quickly by the filter 22. Were the coefficients to be randomly coincident with the signal of interest, then even switching the filter 22 to its non-adaptive mode might not prevent the signal of interest being removed, because the coefficients would then be frozen in coincidence with the signal of interest.

FIG. 2 illustrates the effect of the suppressor 20. FIG. 2(a) represents the frequency spectrum of the input signal 24. The spectrum may include an interference component 42, which may be external interference or the artificial interference signal 40. In the case that the signal 24 is not recognized as containing a signal of interest, the filter 22 is set in its adaptive mode. FIGS. 2(b) and (c) represent the output signal 28 as the filter 22 adapts to actively cancel the interference component 42 within a certain adaptation response time. FIG. 2(d) represents the frequency spectrum of the input signal containing the interference component 42 and a signal of interest 44. (In FIG. 2(d), the signal of interest 44 is depicted as two frequencies of FSK, although it will be appreciated that only one FSK frequency will be present at any instantaneous moment). When the signal of interest 44 is detected by the detector 38, the filter 22 is switched to its non-adaptive state. The filter coefficients are frozen, such that the filter 22 continues to remove the pre-existing interference component 42. However, the filter 22 does not adapt to remove the signal of interest 44, and the output signal 28 substantially entirely, or at least predominantly, consists of the signal of interest 44.

Figure 2A:
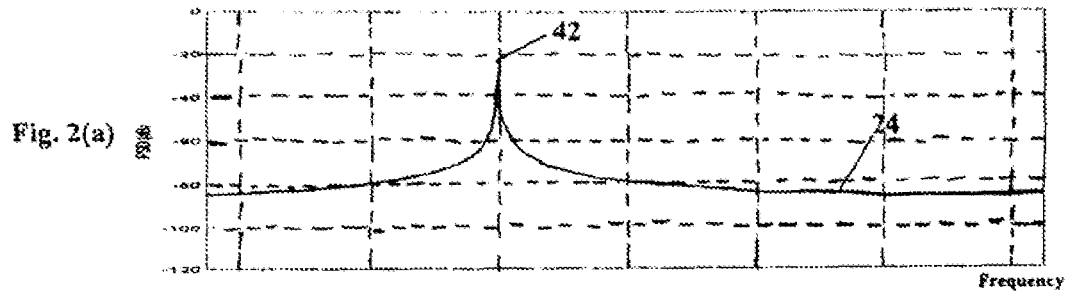
FIGS. 2(a)-(e) are schematic frequency spectrum diagrams illustrating examples of the operation of the suppressor of FIG. 1.
Figure 2B:
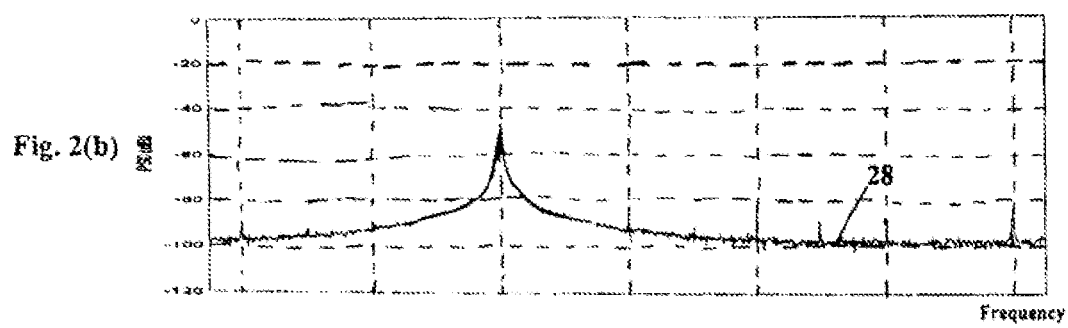
Figure 2C:
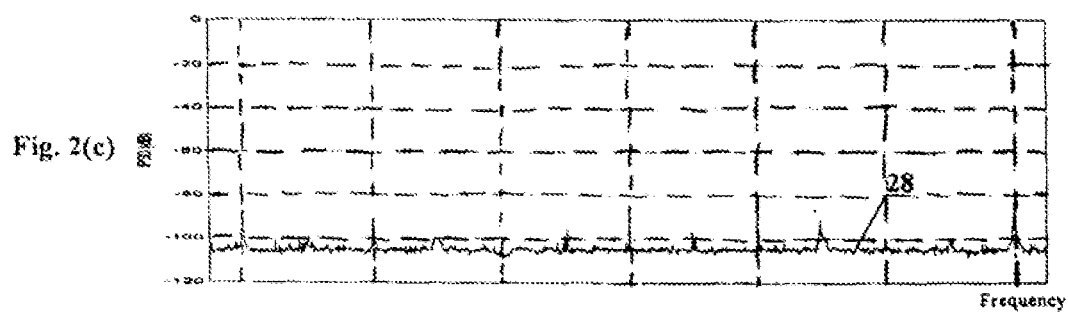
Figure 2D:
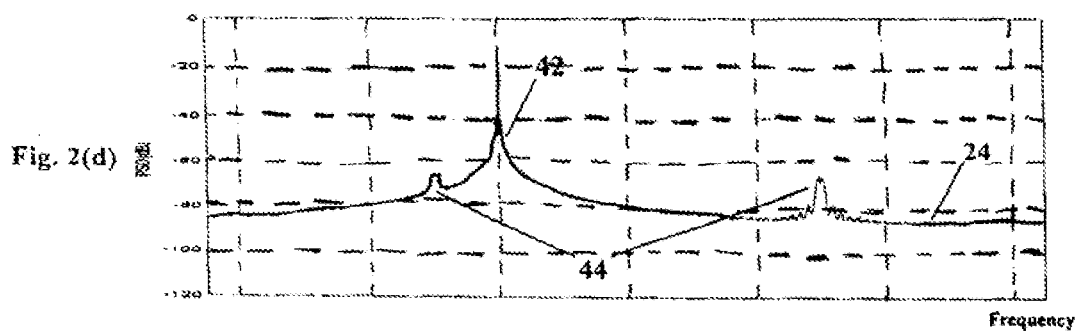
Figure 2E:
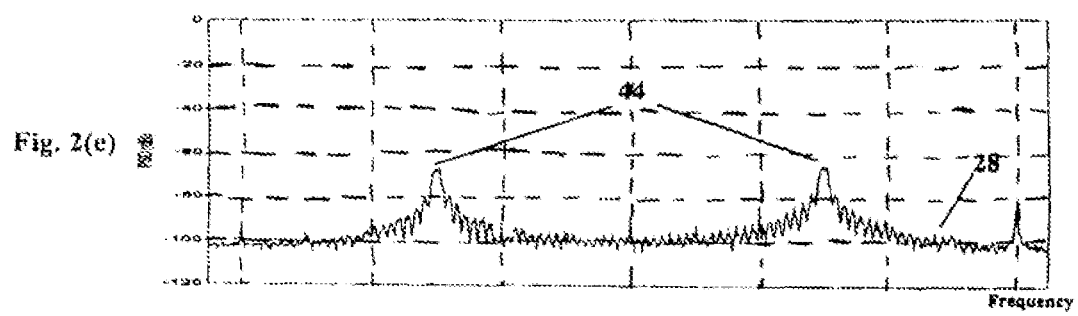

The above principles may provide a highly efficient technique for suppressing interference that has coherence longer than that of a signal of interest. The technique can enable suppression of interference that is close in frequency to the signal of interest (as illustrated in FIGS. 2(d) and (e)), and can also enable suppression of non-strictly sinuous interference signals.

Also, before describing the entire preferred embodiments in detail, the principles of an optional FSK processing and demodulating technique are described with reference to FIG. 3. The FSK tones or frequencies of an FSK input signal 50 may be defined generally as $F_c+/-F_t$, where $F_c$ is a central or carrier frequency, and $2F_t$ is the frequency difference between the tones. The FSK signal 50 may be processed by a frequency converter 52 for converting the FSK signal 50 to a complex baseband signal 54, such that the frequency $F_c$ becomes zero frequency. The frequency converter may include one conversion stage, or multiple cascaded conversion stages.

Figure 3:
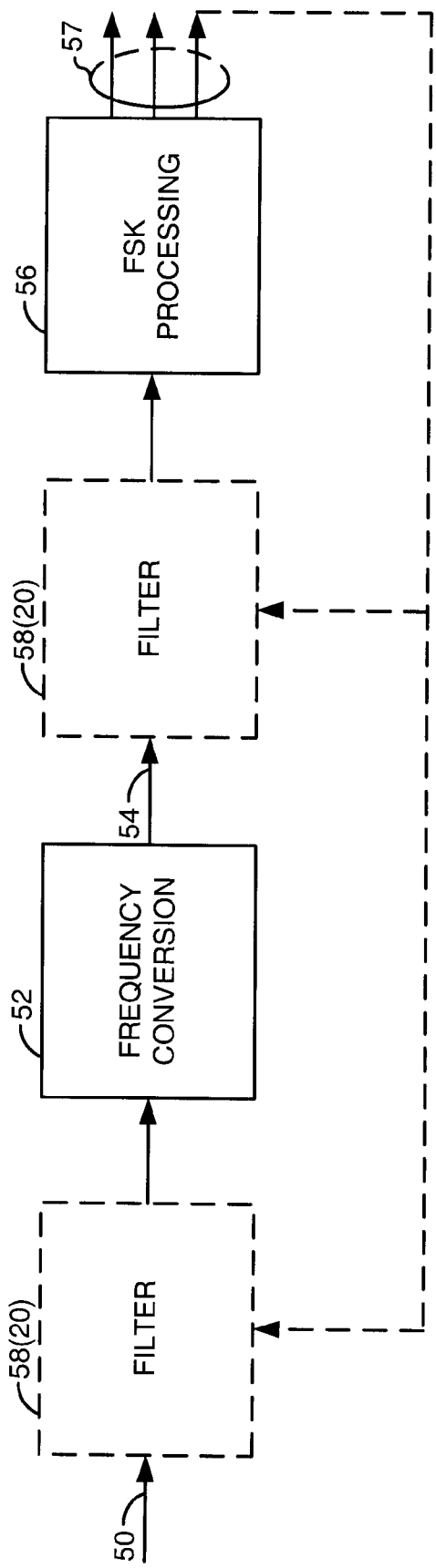
FIG. 3 is a schematic diagram showing the principles of an optional FSK processor.
Figure 13:
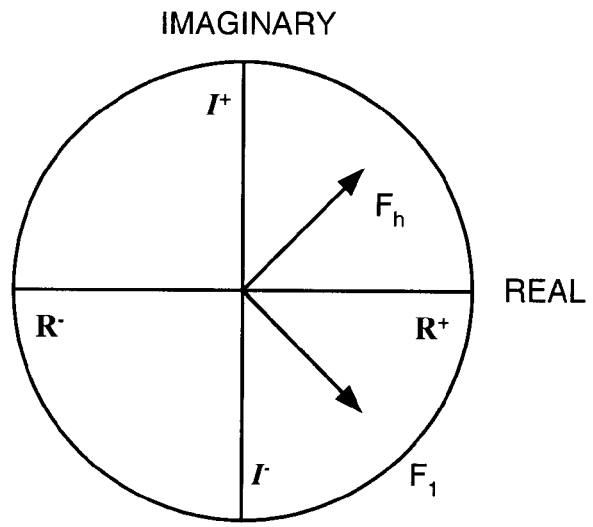
FIGS. 13A and 13B are schematic diagrams of a complex trigonometric circle showing FSK frequencies represented as vectors having different directional characteristics (polarizations) for two different cases of carrier frequency (FIG. 13A shows case of a small (or zero) carrier frequency error, and FIG. 13B shows case of a larger carrier frequency error)
Figure 13:
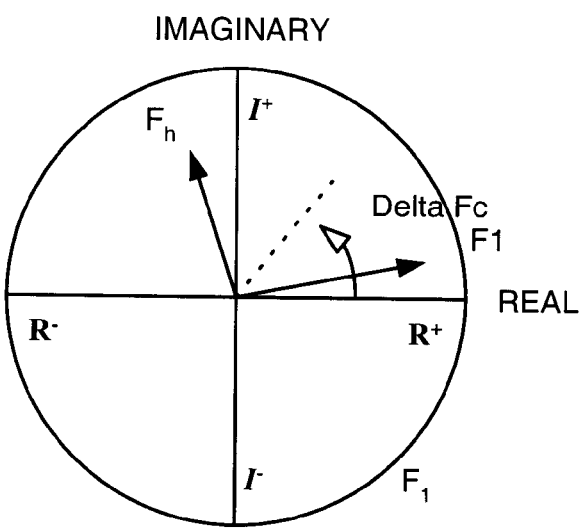

Referring to both FIGS. 3 and 13A, processing section 56 may process the complex baseband signal 54 to extract information from the signal of interest according the polarization of the complex baseband signal 54. In this example, it may be assumed that the carrier frequency $F_c$ is equal to the theoretical frequency expected at the receiver. The complex baseband signal 54 is centered at zero frequency, such that the upper FSK tone (originally $F_h=F_c+F_t$) becomes $F_t$, and the lower FSK tone (originally $F_l=F_c-F_t$) becomes $-F_t$. In the complex baseband, the positive frequency $F_t$ has a first (e.g., positive) polarization. The negative frequency $-F_t$ corresponds to a signal having a different second (e.g., negative) polarization. The polarizations are illustrated in FIG. 13A. The two frequencies are represented by vectors having two different directional or polarization characteristics, for example, phase angle. The two frequencies may be discriminated by distinguishing between the two polarization characteristics. Toggling between the frequencies may be discriminated by detecting a jump in the directional characteristic.

The polarization may be estimated or derived using an autocorrelation function. The first preferred embodiment may discriminate between the two frequencies using the sign of the imaginary part of the complex signal (corresponding to discrimination based on a quantization unit of 180 degrees of the trigonometric circle). The second preferred embodiment may discriminate between the two frequencies using the signs of the real and/or imaginary parts of the complex signals (corresponding to discrimination based on a quantization unit of 90 degrees of the trigonometric circle), for enhanced robustness to poor tolerance signals. The third preferred embodiment may discriminate between the two frequencies according to narrower units of angular quantization, for even greater robustness to poor tolerance signals.

The polarization may be used to identify the start and/or end point of an FSK message. In the absence of an FSK signal (or any coherent signal), the polarization will vary randomly with noise. In the presence of an FSK signal (or a coherent signal), the polarization will stabilize according to whether the signal frequency is positive or negative in the complex baseband. An FSK signal may be identified by the polarization switching within a predetermined interval. One or more control signals 57 may be generated to indicate detection of an FSK signal for controlling other processes.

One of more filters 58 may be used upstream of the processing section 56 and/or of the frequency converter 52, and/or within the frequency converter 52. The filter or filters 58 may function to suppress interference that might affect the FSK detection and/or demodulation. The filter or filters 58 may include a filter for suppressing coherent interference, such as the interference suppressor 20 described above with reference to FIGS. 1 and 2. In the case of an interference suppressor 20 as aforesaid, one of the control signals 57 may be used to switch the interference suppressor 20 between its adaptive and non-adaptive modes. Such a filter 58 (20) may improve performance by removing pre-existing coherent interference components that might otherwise interfere with the net polarization of the complex baseband signal 54.

Having described the principles of certain optional features usable in the present invention, the preferred embodiments are now described in detail. The same reference numerals as those above are used where appropriate.

First Preferred Embodiment

Figure 4:
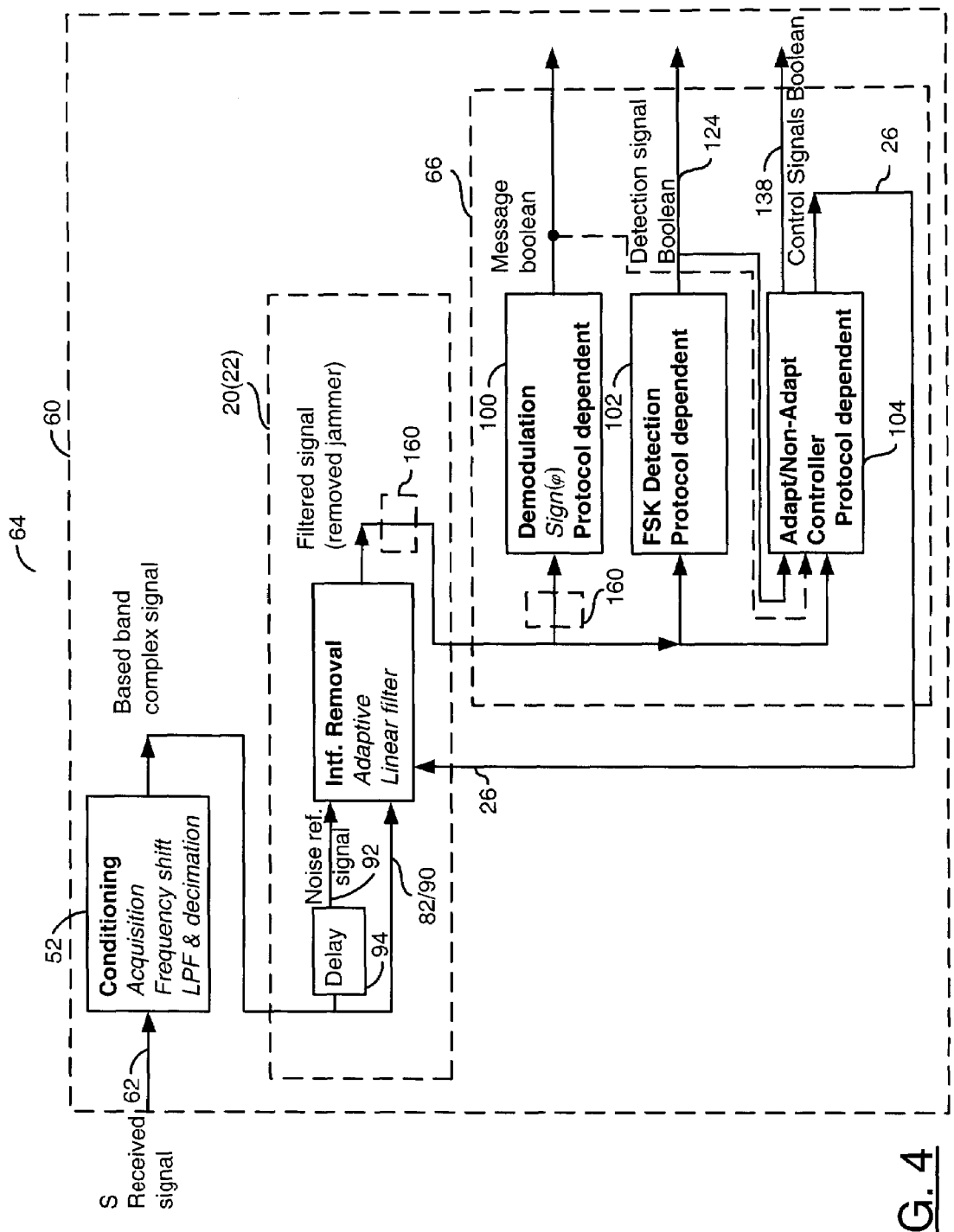
FIG. 4 is a schematic block diagram showing a signal processor of a communications receiver.

Referring to FIG. 4, a signal processor 60 is illustrated for processing a received FSK communications signal 62 in a receiver 64. The receiver 64 may be a wireless receiver, for example, a radio, microwave or infra-red receiver. One application of the present embodiment is in the field of remote control of security systems, for example, for vehicle security systems (e.g. alarm, immobilizer and/or door locks) or building security systems (e.g. alarm and/or door locks). The signal processor 60 may be implemented in hardware, or as software executed on a processor, or a mixture of hardware and software. The signal processor 60 may comprise a mix of analog and digital processing circuits.

The signal processor 60 may generally comprise a first conditioning section 52 for bandpass-filtering the received signal 62 and converting the frequency of the received signal to a complex baseband, a second section 22 for removing coherent interference signals in the baseband, and a third section 66 for processing the resulting signal to obtain information relating to an FSK signal of interest. The first section may include the frequency conversion stage 52 described above. The third section 66 may combine the detector 36 and FSK processing section 56 described above.

As mentioned above, the FSK components 44 (also 44a and 44b) may be represented as a centre or carrier frequency $F_c$ plus or minus an FSK offset $F_t$. For example, $F_c$ may be 314 MHz for Japan or 433 MHz for Europe. $F_t$ may be about 30 KHz, so that the difference between the two FSK frequencies 44 is about 60 KHz.

Figure 5A:
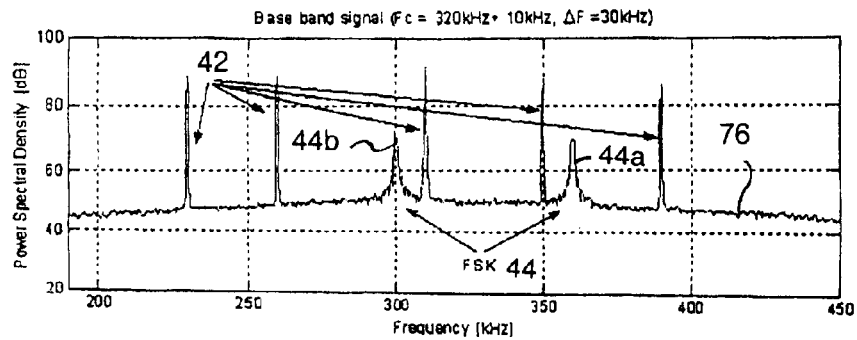
FIGS. 5(a)-(c) are schematic frequency spectrum diagrams illustrating an example of a signal at different processing stages of the signal processor of FIG. 4.
Figure 6:
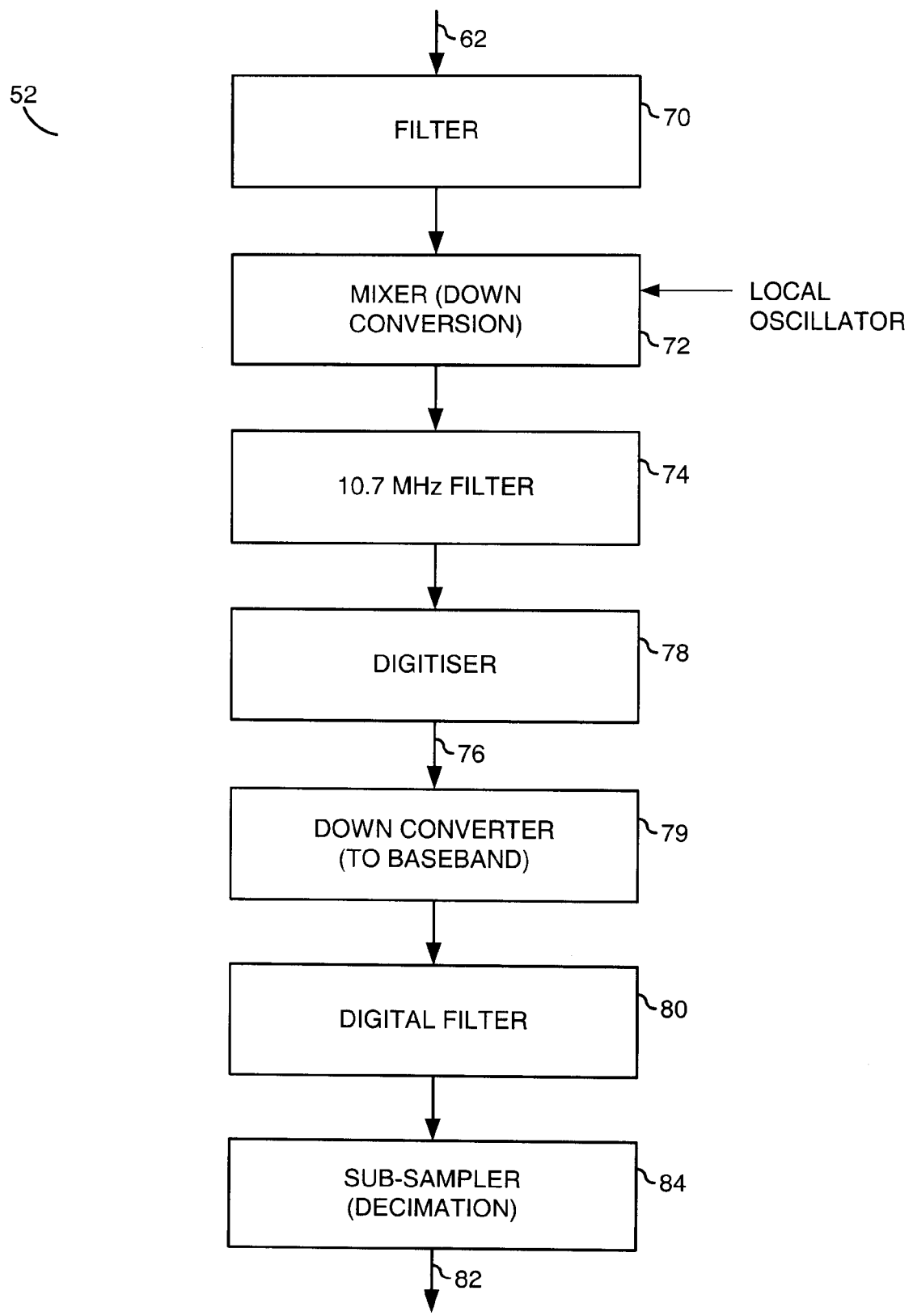
FIG. 6 is a schematic block diagram showing information processing stages in a first conditioning section of the signal processor of FIG. 4.

Referring to FIG. 6, in the first section 52, the signal 62 may firstly be bandpass filtered by a first analog bandpass filter 70. Typically, the width of the pass-band of the filter 70 is about 10% of the carrier frequency $F_c$. After bandpass filtering, the signal is fed to a frequency mixer 72 for down conversion to an intermediate frequency for further filtering by a second analog bandpass filter 74. The intermediate frequency may typically be 10.7 MHz, because a wide range of filter circuitry 74 is currently already available based on the 10.7 MHz intermediate frequency standard. The resulting bandpass filtered signal may typically have a bandwidth of about 600 KHz. It may be difficult to achieve a narrower pass band using further analog filters. Therefore, in the present embodiment, the signal is digitized by a digitizer stage 78, for further digital processing. For example, the signal may be sampled at a sampling frequency of, for example, about 1.3 MHz (about twice the signal bandwidth). FIG. 5(a) illustrates the digitized signal 76, centered at a frequency of about 320 or 330 KHz as a result of the sampling (aliasing effect). The signal includes the FSK frequencies 44, and potentially one or more interference components 42 that are relatively close to the FSK frequencies 44 (i.e. within the 600 kHz bandwidth).

The digitized signal is then down converted to baseband by stage 79, and filtered by a digital filter stage 80, which may narrow the bandwidth further, for example, to about 120-130 KHz. Finally, the signal is decimated by a down-sampler stage 84, for example, by a factor of about 5.

Figure 5B:
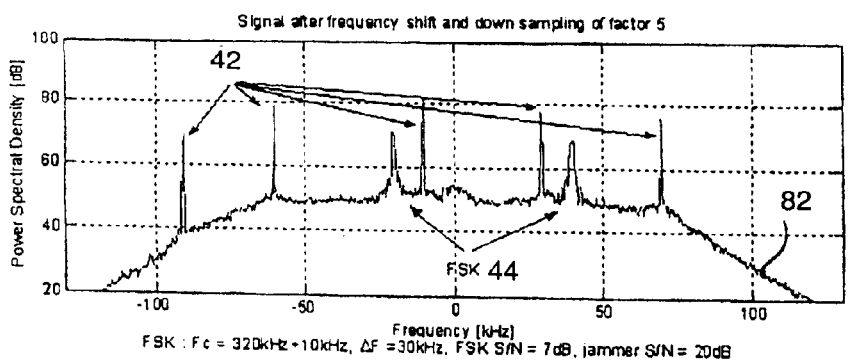

FIG. 5(b) illustrates the resulting decimated signal 82 in the baseband. As can be seen in FIG. 5(b), the different FSK tones 44a and 44b lie respectively above and below zero frequency in the baseband, as a result of the frequency shifter (stage 79). As explained above, this may enable the different FSK tones 44a and 44b to be detected and demodulated based on the polarization of the signal in the complex baseband. Also, the components of the signal 82 outside the 120-130 KHz band (centered at zero frequency) are at least partly attenuated, as a result of the digital filter (stage 80). Such a narrow bandwidth can provide a large degree of noise rejection, so that the subsequent interference suppression techniques can be used most effectively to suppress close-frequency interference (i.e. close to the frequencies of the FSK signal of interest), and relatively straightforward techniques may be used for FSK detection, classification and demodulation of the FSK tones 44a and 44b. Finally, an advantage of decimating the signal is the subsequent processing cost reduction. In general, the cost and complexity of digital processing circuitry is dependent on the sampling rate employed. Using a baseband signal can provide significant advantages in reducing the cost and complexity of the signal processor 60.

It will be appreciated that the foregoing embodiment of signal conditioning is merely an example, and that many other conditioning and/or bandwidth filtering and/or frequency conversion techniques may be used.

Figure 5C:
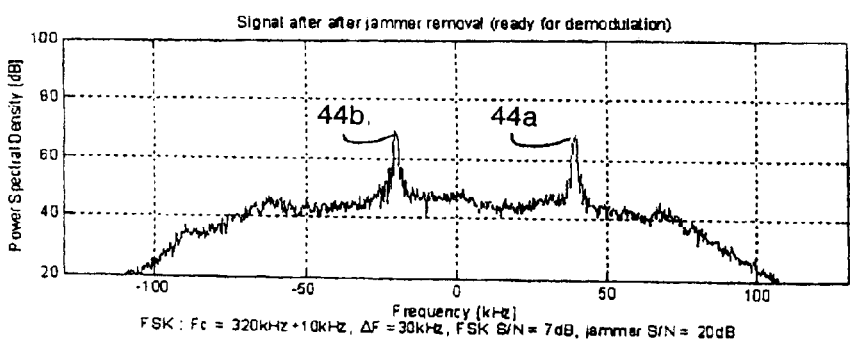

Referring to FIGS. 4, and 5(c), the second section 20 processes the signal 82 in the complex baseband to remove coherent interference components 42 not recognized as a single of interest. The second section 20 is based on a wiener filter, having a signal input 90 and a reference input 92 provided via a delay 94. The filter may be similar to that already described with reference to FIG. 1, and further described later with reference to FIGS. 10-12. The second section 20 receives a control signal 26 from the third section 66. In this embodiment, the control signal is asserted (high) for setting the suppressor 20 in its adaptive mode, and deasserted (low) for setting the suppressor 20 in its non-adaptive or frozen mode. In the adaptive mode, the suppressor 20 actively adapts to cancel the pre-existing interference components 42. When a signal of interest is detected by the third section 66, and the suppressor 20 is switched to its non-adaptive mode, the suppressor 20 continues to cancel the pre-existing interference components 42, but not the new signal of interest components (FSK components 44a and 44b in FIG. 5(c)).

The third section 66 may comprise a demodulation section 100, a detection section 102 and a control signal generator 104.

In the demodulation section 100, the demodulation is based on the fact that each FSK tone presents a different polarization sign (positive or negative) in the complex baseband. An auto-correlation (Q) of the signal (S) is used to estimate the polarization in a robust manner, while reducing the effects of background noise (N) in the signal. Generally, noise occurs only in the limited bandwidth of +/−65 KHz (achieved by the digital filter 80), and the noise is white noise (since coherent noise is removed by the suppressor 20). The noise correlation function is almost a Dirac function.

In more detail, the signal model may be represented as $S(t)=A\exp(2\pi jft)+\text{Noise}(t)$. In the following mathematical expressions the frequency (f) and the time (t) variables are normalized, respectively, in relation to the sampling frequency ($F_{SD}$) and the sampling period ($\Delta T_s$).

Computing the first correlation function point:

$$E\{S(t)S^*(t-1)\} = E\{(A\exp(2\pi jft) + \text{Noise}(t))$$
$$(A\exp(-2\pi jft + 2\pi jf) + \text{Noise}^*(t-1))\}$$
$$= E\{A^2\exp(2\pi jf)\} + E\{\text{Noise}(t)\text{Noise}^*(t-1)\}$$
$$= E\{A^2\exp(2\pi jf)\}$$

because the noise correlation is microscopic and it is not correlated to the FSK signal. Therefore, the correlation function point only depends on the signal of the FSK frequency f. Consequently, the following conditions are obtained:

If $f>0$ then $\text{Sign}(\text{Imag}\{A^2\exp(2\pi jf)\})>0$

If $f<0$ then $\text{Sign}(\text{Imag}\{A^2\exp(2\pi jf)\})<0$

An expectation value K(t) may be defined representing the expected frequency or polarization, in the range +1 or −1. The expectation value K(t) may be estimated using a stochastic average:

$$K(t)=K(t-1)+\mu_\varphi(\text{sign}(\text{imag}(S(t)S^*(t-1)))-K(t-1))$$

with $\mu_{100}$ representing the adaptation parameter of the averaging function. The demodulated output may therefore be represented by the sign of K(t).

In summary, $$\text{tone}(t)=\text{sign}(K(t))$$

with $$K(t)=K(t-1)+\mu(\text{sign}(\text{imag}(Q(S,t)))-K(t-1))$$

where $\mu$ is a adaptation factor and $$Q(S,t)=S(t)S^*(t-1)$$

The adaptation parameter $\mu$ is preferably set so that the memory in the function represents only a fraction of the duration of a standard period or cycle of the FSK signal (referred to as Tchip). One typical value is $$\mu_\varphi = \frac{6}{(F_{SD} * Tchip)}$$

The value $F_{SD}*Tchip$ may correspond to the number of sample points observed during a Tchip period. The adaptation parameter may also be called the 'forgetting factor'. A large value is equivalent to a rapid adaptation; the past is forgotten rapidly. A small value introduces a longer memory. In the case of $\mu_\varphi$, the objective is to obtain a memory shorter than the Tchip duration. In the present example, this memory is 6 times shorter than the Tchip duration. The reason is to obtain a stationary situation during each Tchip reception period.

The detection section 102 functions to detect the occurrence of a signal of interest in the signal. It is preferred that the detection section 102 be operative to detect a signal of interest rapidly, so that the suppressor 20 can be switched rapidly to its non-adaptive state. It may also be preferred that the detection section includes some hysteresis, to ensure that the frequency toggling in the FSK signal is not misdetected as a false message end. In other words, the detection section 102 may have a rapid response to detecting the beginning of a signal of interest, and a slower response to detecting the end of a signal of interest.

To obtain a robust detection estimation, the detection algorithm may use the same information used for the FSK tone estimation in the demodulation section 100. The aforementioned expectation value K(t) presents stable sign when a (coherent) signal of interest is present. When no pure tones are present this quantity will behave like a noise with a maximum magnitude equal to 1 (value equals + or −1). However, in view of the way the expectation value K(t) is derived, K(t) will get this magnitude only if a stable tone last for some time.

Figure 7:
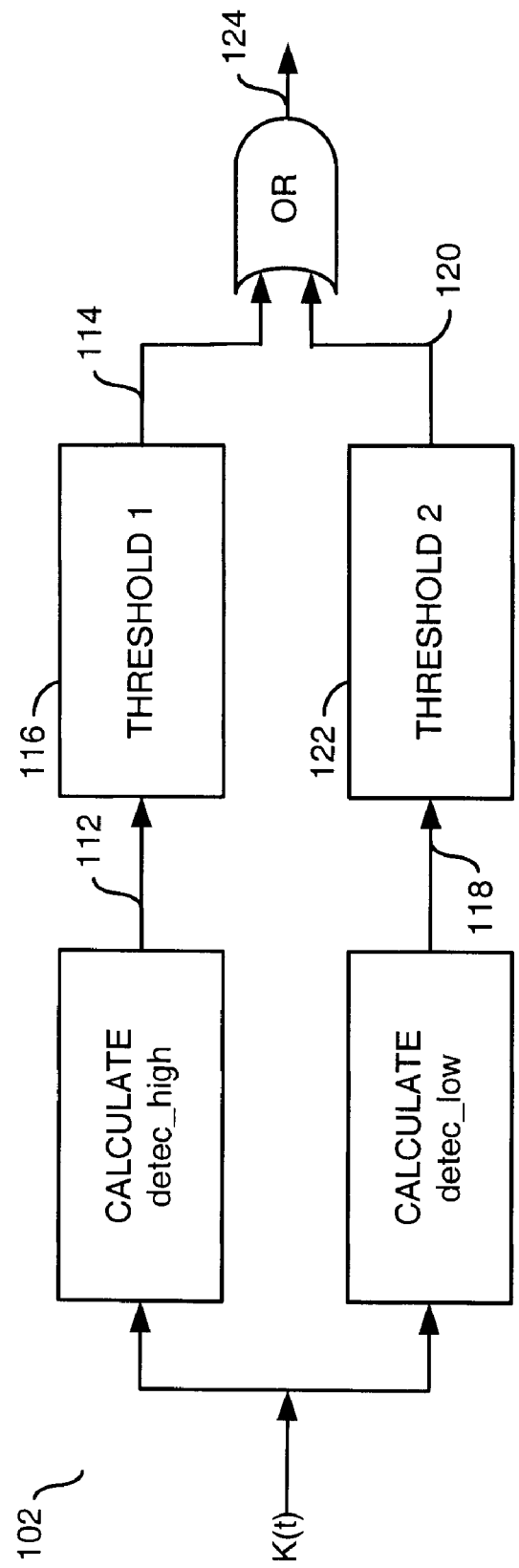
FIG. 7 is a schematic block diagram showing information processing stages in a detector of the signal processor of FIG. 4.
Figure 8:
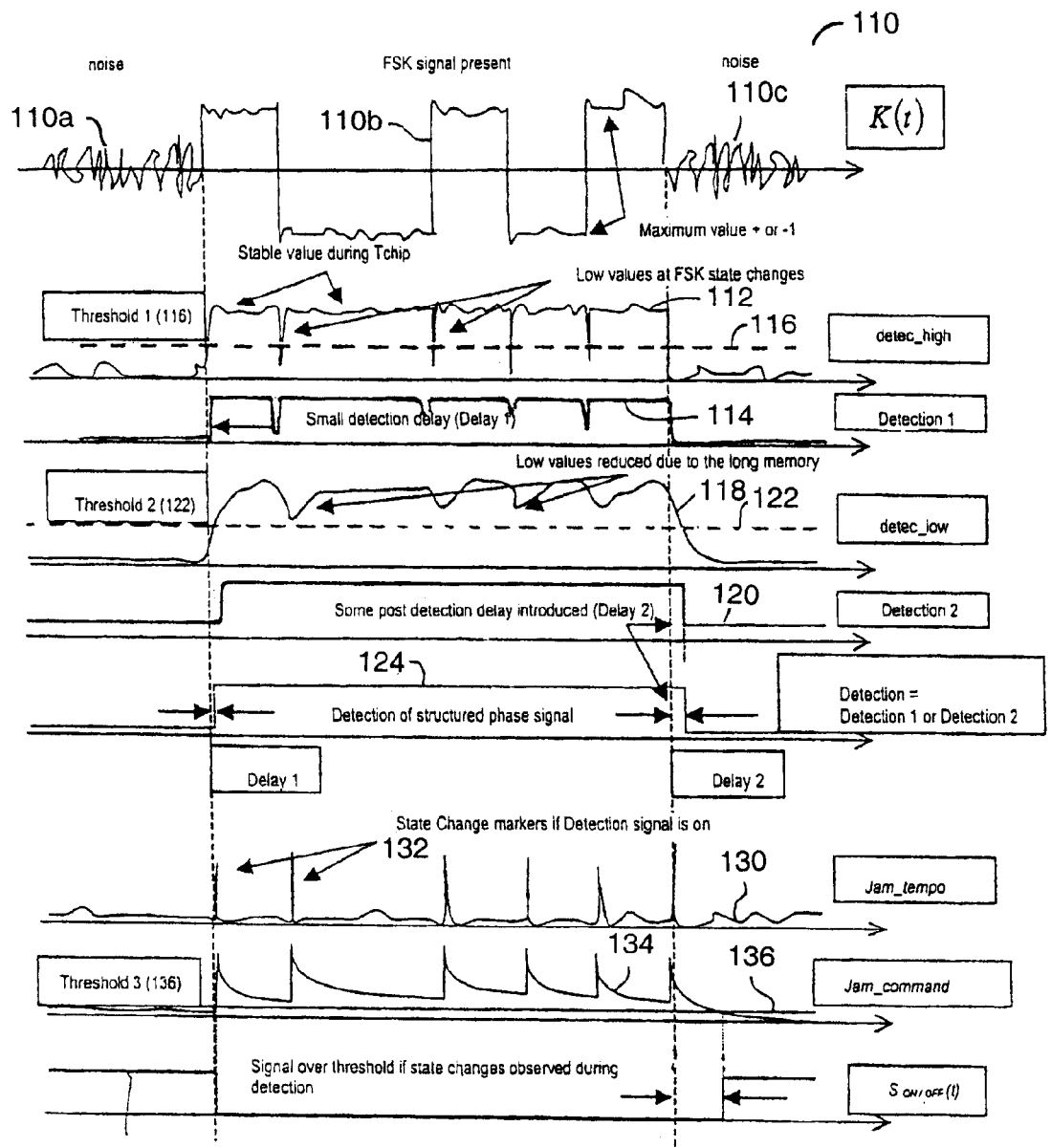
FIG. 8 is a schematic diagram showing examples of a signal in the detector and control signal generator of the signal processor of FIG. 4.

To obtain a clear detection of whether or not a coherent signal is present, the auto correlation is again used. Referring to FIGS. 7 and 8, two averaged detection variables are defined:

det ec_high=det ec_high+$\mu_{DEC\_high}$(K(t)K(t−1)−det ec_high)

det ec_low=det ec_low+$\mu_{DEC\_low}$(K(t)K(t−1)−det ec_low)

These two variables differ only in the values of the adaptation parameters:

$\mu_{DEC\_high}$ and $\mu_{DEC\_low}$

The two adaptation parameters are set respectively to a fraction of the Tchip duration.

$$\mu_{DEC\_high} = \frac{2}{F_{SD}Tchip}$$

$$\mu_{DEC\_low} = \frac{1}{3F_{SD}Tchip}$$

The first parameter $\mu_{DEC\_high}$ provides high speed change behaviour for the variable det ec_high, and the second parameter µDEC$_{low}$ provides low speed change behaviour for the variable detect_low, both illustrated in FIG. 8. In this figure, line 110 represents the expectation value K(t) of the input signal to the detection section 102. The example signal includes a first portion 110a without a signal of interest, a second portion 110b including an FSK signal (represented by the alternating value of K(t) between + and −1), and a third portion 110c following the signal of interest. Line 112 represents the detection variable detect_high computed from K(t), and is an average of the autocorrelation of K(t) over a relatively short period. Line 112 therefore represents the degree of coherence in K(t) over a short period, and is especially suitable for detecting the beginning of the signal of interest (110b). A first detection signal Detection 1 (indicated by line 114) is obtained by thresholding the detection variable det ec_high at a first threshold (Threshold 1) 116, using the following function:

If det ec_high>Threshold_1 then Detection_1=1 else Detection_1=0

As can be seen in FIG. 8, the first detection signal 114 provides a rapid indication for detecting the beginning of the signal of interest (110b). However, the first detection signal 114 may be vulnerable to false detection of the end of the signal of interest, because the rapid adaptation of det ec_high (line 112) may cause det ec_high to drop below the first threshold 116 for each change of FSK tone. Therefore, the slowly adapting variable detect_low is used to provide a second detection signal Detection 2 that gives some hysteresis in the detection. In FIG. 8, line 118 represents the detection variable detect_low computed from K(t), and is an average of the autocorrelation of K(t) over a longer period. As can be seen in FIG. 8, the line 118 is slower to respond to changes in K(t), and is less affected by the frequency toggling in the FSK tone. A second detection signal Detection 2 (indicated by line 120) is obtained by thresholding the detection variable detect_low at a second threshold (Threshold 2) 122, using the following function:

If det ec_low>Threshold_2 then Detection_2=1 else Detection_2=0

As it can be seen in FIG. 8, the second detection signal 120 remains active during the entire duration of the signal of interest (110b).

The final detection signal 124 may be generated by combining the first and second detections signals 114 and 120, for example by a logical OR combination Detection=Detection_1 or Detection_2

Therefore, the final detection signal 124 can have the properties of: a rapid response to the beginning of a signal of interest (provided by the first detection signal 114); and continuous detection throughout the duration of the signal of interest (provided by the second detection signal 120).

The first and second thresholds may be determined experimentally. Examples values are:

Threshold_1=0.2;

Threshold_2=0.1;

The above detection technique is based on detecting only the coherence of a signal of interest, regardless of the power of such a signal. In order to increase the robustness of detection against coherent noise that might be introduced in the digital signal processor itself, a further refinement may be to include a signal power limitation, which can threshold "out" low-power coherent noise. For example, the signal power (real part) of the signal S(t) may be estimated, and compared to a threshold Threshold_min. If the signal power is below this threshold, then the detection signal 124 may be forced to zero, for example by multiplying, or logical ANDing, the detection signal 124 by a control factor Detection_min 126. This process may be represented by the three steps of:

power(t+1)=power(t)+µ$_{DEC\_high}$(real(S(t+1))$^2$−power(t))

If power(t+1)>Threshold_min then Detection_min=1 else Detection_min=0

Detection=Detection*Detection_min;

As mentioned above, the detection signal 124 represents the occurrence of a signal of interest, regardless of whether the signal is a true FSK signal, or merely a new coherent interference signal that has not yet been removed by the suppressor 20. The control signal generator 104 is responsive to the detection signal 124 and to K(t) to generate the control signal 26 therefrom. The control signal generator 104 only deasserts the control signal 26 (non-adaptive mode) when, during an active detection signal 124, one or more characteristics of K(t) are detected representative of an FSK signal.

Figure 9:
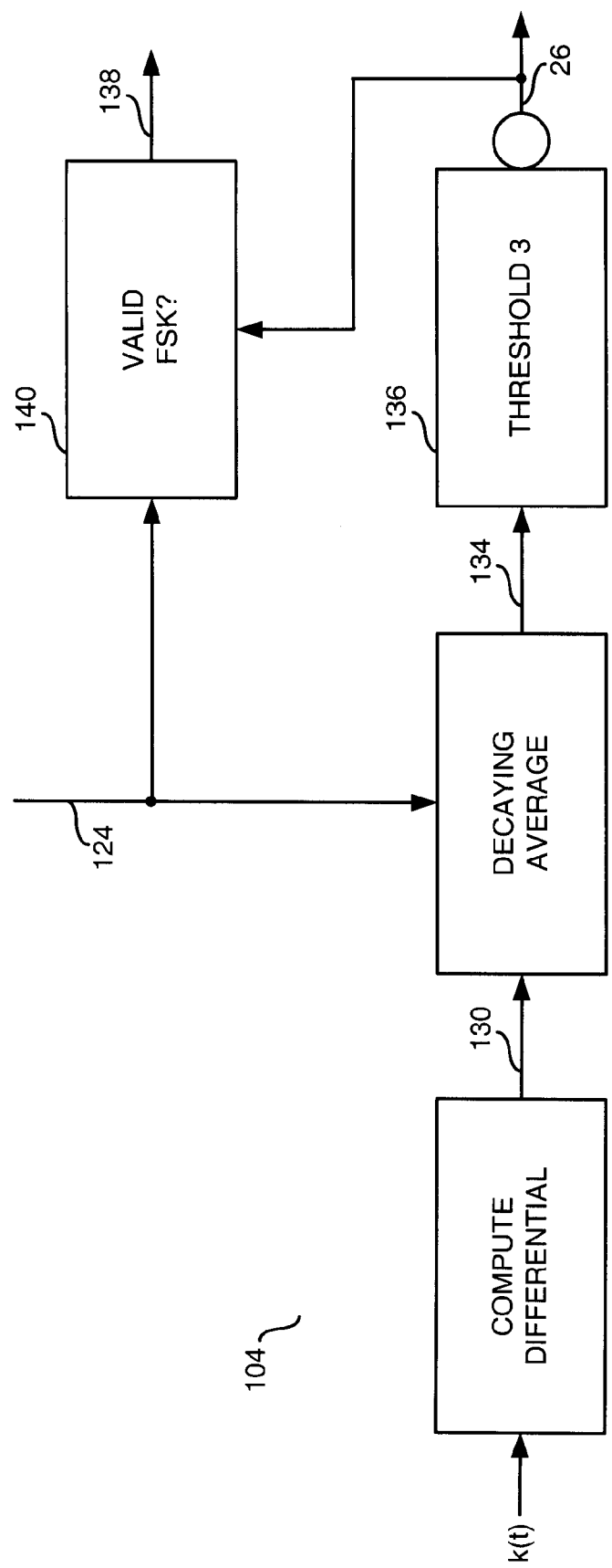
FIG. 9 is a schematic block diagram showing information processing stages in a control signal generator of the signal processor of FIG. 1.

In the present embodiment, the control signal generator 104 detects periodic changes in K(t). A property of a typical FSK signal is that the FSK signal will always toggle between the two different tones within a certain maximum interval. Referring to FIGS. 8 and 9, a differential of K(t) is calculated (line 130), and contains spikes or "state change markers" 132 at each change of the FSK signal (110b). A decaying average function is applied to the differential signal 130, to generate a decaying differential signal (line 134) for those markers detected during the active detection signal 124. A third threshold (Threshold 3) 136 is applied to the decaying average signal 134, to generate the control signal 26. The control signal 26 is asserted (adaptive mode) when the decaying average 134 is below the third threshold 136, and is deasserted (non-adaptive mode) when the decaying average 134 is above the third threshold 136. In FIG. 9, an inverting output of the threshold function 136 is shown, to represent that the state is generally opposite to that discussed for the first and second threshold functions 116 and 122.

In use, when the signal of interest 110b is an FSK signal, the detection signal 124 goes active at the beginning of the detection of the signal of interest, and the frequency toggling in the FSK signal results in sufficiently "frequent change state markers" 132 being generated to keep the decaying average 134 above the third threshold 136, and thereby hold the control signal 26 deasserted. Therefore, the suppressor 20 does not adapt to actively remove the FSK components, and the full FSK, message can be demodulated by the demodulation section 100. At the end of the FSK message, the detection signal 124 is deactivated (after the short delay provided by the second detection signal 120), which prevents any further "spikes" 132 from being added to the decaying average 134. After a further short period, the decaying average 134 drops below the third threshold 136, and the control signal 26 is again asserted to switch the suppressor 20 to its adaptive mode.

Should the signal of interest 110b be a new coherent interference component (not FSK), then the detection signal 124 will still be activated at the beginning of the signal of interest, and a first state change marker 132a will be generated caused by the beginning of the signal of interest. Accordingly, as with the FSK example, the control signal 26 will be deasserted as a rapid response to the signal of interest, to switch the suppressor 20 to is non-adaptive mode. However, the new coherent interference will not toggle in frequency (as would an FSK signal), and no further stage change markers 132 will be generated. In the absence of further stage change markers 132, the decaying average 134 will soon drop below the third threshold 136, causing the control signal 26 to be re-asserted, to switch the suppressor 20 back to its adaptive mode. In the adaptive mode, the suppressor 20 adapts to actively cancel the new component in the signal. Therefore, the signal 110 reduces towards zero, and the detection signal 124 is deactivated (after the short delay provided by the second detection signal 120).

From the above, it may be appreciated that, when a signal of interest is detected, the control signal 26 is always deasserted in rapid response to the new signal of interest. However, unless the signal of interest continues to change state within predetermined intervals indicative of an FSK signal, the control signal 26 is soon re-asserted to switch the suppressor 20 back to its adaptive mode, to actively cancel the signal of interest. In other words, the signal of interest is re-classified as not being of interest, and this re-classification switches the suppressor 20 back to its adaptive state. The control signal 26 may therefore represent the true state of whether or not a signal is currently considered to be "of interest".

The same principles may apply if, during FSK reception, the reception signal is affected by a new coherent interference component. If the new interference component is sufficiently strong to swamp the FSK signal, then the expectation value K(t) will become swamped by the coherent interference, and will no longer change state between + and −1.

Therefore, no further state change markers 132 will be generated, and the decaying average 134 will soon drop below the third threshold 136. As soon as this happens, the control signal 26 is re-asserted, to switch the suppressor to its adaptive mode. In the adaptive mode, the suppressor 20 adapts to actively cancel both the FSK and the new interference component swamping the FSK. Therefore, the FSK detection is stopped.

The detection signal 124 and the control signal 26 may also be used to distinguish between valid and non-valid FSK signals. At the beginning of signal of interest, the detection signal 124 is activated, and the control signal 26 is deasserted. If the control signal 26 becomes re-asserted while the detection signal 124 is still active, this is indicative of an invalid signal of interest. Either the signal of interest is not FSK, or an FSK signal is swamped by a new interference component starting during the FSK message. If the detection signal 124 is deactivated before re-assertion of the control signal 26, this is indicative of a valid FSK message. A second control signal 138 indicative of a valid FSK message can be generated by a suitable logical combination (140 in FIG. 9) of the detection signal 124 and the control signal 26. The second control signal 138 may be highly advantageous in avoiding erroneous interpretation of an invalid FSK signal demodulated by the demodulation section 100.

The signal processor 60 may be operative in a power saving, intermittently activated mode. For example, the signal processor 60 may be activated about every 200 ms for an on period of about 10 ms. The rapid response of the detection stage 102 and the control signal generator stage 104, enables the suppressor 20 to be switched to its non-adaptive mode quickly when a signal of interest is detected. Once the signal of interest is detected, then the signal processor 60 is switched to a continuously operative mode to receive and demodulate the FSK message. When the signal of interest ends, the signal processor 60 may be switched back to its intermittently operative power saving mode.

Figure 10:
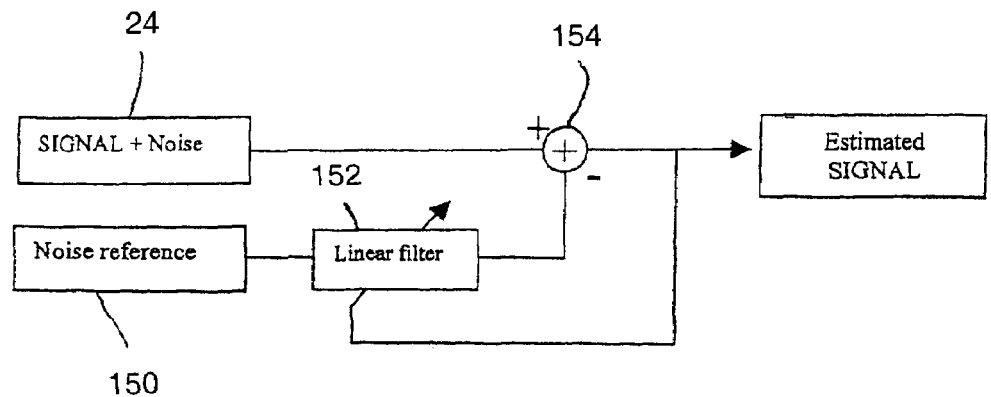
FIG. 10 is a schematic block diagram showing the principles of a wiener filter.

FIG. 10 illustrates the principles of using a wiener filter to cancel coherent interference in the received signal 24, based on a coherent noise reference 150. The noise reference 150 may be derived from the received signal 24, delayed by a suitable delay, as discussed further below. The wiener principle is to estimate a linear filter 152 that allows generation of a signal that can be subtracted from the received signal 24 by the subtractor 154. After subtraction, only the signal components not related to the noise reference 150 remain.

Finite Impulse Response (FIR) filters or Infinite Impulse Response (IIR) filters may be used for the linear filter. FIR filters have an advantage in terms of stability. However, some limitations of FIR filters may result in additional processing complexity and cost. In order to be able to cancel the effect of interference close to a signal of interest, the number of FIR taps should be increased to give the appropriate degree of freedom to the filter. For example, in order to be able to cancel up to 5 interference components, the minimum number of theoretical filter taps is 10. In practice, because of noise estimation, this number should be increased, typically to about 30. The number of taps may be directly related to the processing complexity and cost, and should preferably be as small as possible to reduce the computational load.

Figure 11:
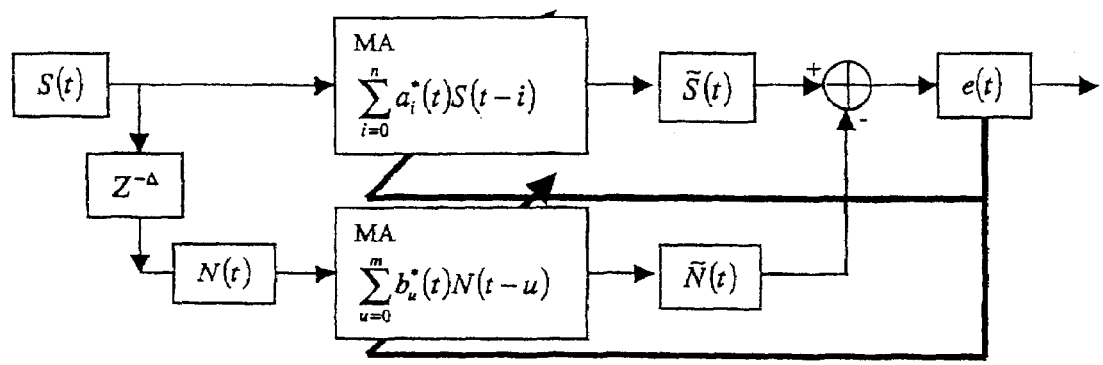
FIG. 11 is a schematic block diagram showing the arrangement of a series-parallel filter arrangement using finite impulse response filters.

In general, an IIR filter may provide more efficient implementation with greater flexibility. In order to avoid stability problems, it may be preferred for the IIR to be implemented in a serial-parallel manner, as shown in FIG. 11. The mathematical processing stages are listed in the table of FIG. 12.

The time delay $Z^{-\Delta}$ may be set to a value of the same order as the lengths of the filters. It may be preferred to reduce the delay $Z^{-\Delta}$ as much as possible, to provide for relatively fast adaptation of the filter to cancel signal components. The minimum delay may be one greater than the number of taps per filter. For example, if each filter contains 15 taps, then the delay is equivalent to 16.

As mentioned above, and by way of illustration, the number of taps of each filter may be about 15 (giving a total of 30 effective taps for the series-parallel arrangement). If the sampling frequency is 260 KHz (decimation by a factor of 5), the $Z^{-\Delta}$ delay is equivalent to approximately (1+15)/(260000)=0.06 ms.

When the filter arrangement is used in an intermittently operated, power saving mode, the coefficients from the previous activation cycle are retained as history of the interference components, and used as the initial coefficients for the next activation cycle.

The algorithm for updating the filter coefficients in the adaptive mode may be a Least Means Square (LMS) algorithm type. The algorithm attempts to minimize the correlation between the signal output and the noise reference (time delayed version of input signal), to update the filter taps for each received point. This "innovation" is multiplied by a coefficient α and is added to the previous tap's value. The magnitude of the innovation depends on the signal modulus before the algorithm convergence. At convergence, this correlation tends to 0. The convergence speed is therefore a function of the coefficient α and the signal magnitude. Some limits exist for α to ensure algorithm stability. To obtain a robust algorithm with a constant convergence speed, a normalized LMS algorithm may be used. A normalized algorithm may be used. A normalized algorithm may be especially advantageous if no automatic gain control is employed in the receiver 64. In a normalized algorithm, the innovation is multiplied by a factor α/power(t), where power(t) represents the signal power. The term power (t) may be estimated using a stochastic expression:

power($t$+1)=power($t$)+μ$_{power}$($S_{CF}$($t$+1)$S_{CF}^*$($t$+1)−power($t$))

where μ$_{power}$ represents a forgetting factor. The forgetting factor may be adjusted to represent the average power over a certain time duration.

Other suitable algorithms for updating the filter coefficients may be used, for example, Recursive Least Mean Squared. A recursive least mean squared algorithm may give a faster convergence speed, but at the expense of additional computational overhead. The (normalized) LMS may provide computational efficiency at the expense of slower convergence. However, a slower convergence speed may still be eminently satisfactory.

As mentioned previously, it may be desirable to add an artificial interference component 40 to the received signal, so that the filter coefficients are never completely unpredictable. In the absence of any interference component, there might be a risk that the coefficients are unpredictable and, coincidentally, in a state for cancelling a signal of interest. In such a state, there may be insufficient time for detector 102 to detect the signal of interest and switch the filter to its non-adaptive state before the filter acts to cancel the signal of interest. There may be a difference in reaction speed of the filter between a situation in which the filter has is not actively canceling an existing interference component (relatively fast filter reaction speed when new signal arrives, as the filter has full degree of freedom), and a situation in which the filter is already actively canceling an existing interference component (relatively slower filter reaction speed, as the filter has less degree of freedom to adapt to multiple signal components). A convenient way to add the artificial interference component is to add a constant value (frequency=0) in the complex baseband, either to the real part or the imaginary part of the signal. It may be preferred to add the artificial constant value to the imaginary part, to avoid conflicting with the power measurements referred to above, based on the real part of the signal.

Second Preferred Embodiment

The second preferred embodiment is very similar to the first preferred embodiment. The main difference lies in the manner in which the first and second FSK frequencies are discriminated in the complex baseband. The second embodiment uses the same circuitry and techniques as those of the first embodiment, except for the following differences.

As mentioned above, the demodulation is based on the fact that each FSK modulation frequency presents a different polarization (directional characteristic) in the complex baseband. For a given FSK ΔF range, it is possible to determine a certain sampling frequency for which the sign of the real and/or imaginary part of the autocorrelated signal can be utilized for demodulation of the FSK message. With an optimum sampling frequency, the phase between the two frequencies in the complex baseband is at least 90 degrees. Consequently, the two frequencies correspond to different real-imaginary quadrants of the trigonometric circle. In the case that the carrier frequency of the FSK signal deviates by only a small amount from the expected (or intended) carrier frequency, this results in a positive or negative polarization detected in the imaginary part of the complex signal (the principle used for demodulation in the first embodiment), as illustrated in FIG. 13A. However, if the carrier frequency does deviate significantly from the expected frequency (which is quite possible due to poor tolerances of transmitters in practice), then it is the sign of the real part of the complex signal that may vary instead of the imaginary part, as illustrated in FIG. 13B.

In the following explanation, the difference between one FSK tone (one demodulation frequency) and the carrier frequency is denoted as Δf (previously referred to as F$_t$). The separation between the two demodulation frequencies is 2Δf. This separation must be greater than one fourth of the sampling frequency F$_S$ to ensure that there is a difference in quadrant between the two demodulation frequencies. Additionally, the separation should not exceed three quadrants, otherwise this would interfere with discrimination between the two different frequencies. This leads to the following formulas:

2Δf>F$_S$/4 and 2Δf<3F$_S$/4

Therefore,

F$_S$<8Δf

F$_S$>8Δf/3

In practice Δf may very in a range defined by lower and upper tolerance limits Δf$_{min}$ and Δf$_{max}$, respectively that the receiver may be capable of handling or due to unpredictable frequency range at transmitter. Therefore, we must have:

8Δf$_{max}$/3<F$_S$<8Δf$_{min}$.

For example, if Δf$_{min}$=20 KHz and Δf$_{max}$=45 KHz, then 120<F$_S$<160 KHz.

Provided that the sampling frequency F$_S$ lies within the above range, it is possible to distinguish between the two demodulation frequencies, according to the quadrant in which the complex signal is presented. Discrimination of the signal according to the quadrant may correspond to quantization of the signal by quantization units of 90 degrees in the complex trigonometric circle.

As in the first embodiment, an autocorrelation (Q) of the signal (S) is used to estimate the polarization in a robust manner, while reducing the effects of background noise (N) in the signal. Generally, noise occurs only in the limited bandwidth of +/−65 KHz (achieved by the digital filter 80), and the noise is white noise (since coherent noise is removed by the suppressor 20). The noise correlation function is almost a Dirac function.

In more detail, the signal model may be represented as S(t)=Aexp(2πjft)+Noise(t). In the following mathematical expressions, the frequency (f) and the time (t) variables are normalized, respectively, in relation to the sampling frequency (F$_S$) and the sampling period (ΔT$_S$):

The input signal for demodulation is represented by:

$$S_1(t) = A \sum_{k=-\infty}^{\infty} \chi_1(t - kT)\cos(2\pi f_c t - 2a_k \pi \Delta f t - \varphi_k)$$

It is considered that all of the coherent interference signals are removed by the suppressor 20. The baseband signal may be obtained through a complex demodulation for the theoretical carrier frequency f$_{cTh}$:

$$S_{bb}(t) = A \sum_{k=-\infty}^{\infty} \chi_1(t-kT)\exp(j2\pi\Delta f_c t - j2a_k\pi\Delta f t - j\varphi_k)$$

In which $\Delta f_c = f_{cTh} - f_c$. As explained above, the carrier frequency may deviate from the theoretical expected carrier frequency by a carrier frequency error amount which is $\Delta f_c$.

The signal in the baseband presents a modulation function of the FSK frequency shift and the carrier frequency error $\Delta f_c$.

The correlation function may be calculated:

$$\Gamma(t,1) = S_{bb}(t) * S_{bb}^*(t-1)$$

$$S_{bb}(t) = A \sum_{k=-\infty}^{\infty} \chi_1(t-kT)\exp(j2\pi\Delta f_c t - j2a_k\pi\Delta f t - j\varphi_k)$$

$$S_{bb}^*(t-1) =$$
$$A \sum_{k=-\infty}^{\infty} \chi_1(t-kT)\exp(-j2\pi\Delta f_c(t-1) + j2a_k\pi\Delta f(t-1) + j\varphi_k)$$

$$S_{bb}(t) * S_{bb}^*(t-1) \approx A^2 \sum_{k=-\infty}^{\infty} \chi_1(t-kT)\exp(-j2\pi\Delta f_c - ja_k\pi\Delta f)$$

$$S_{bb}(t) * S_{bb}^*(t-1) \approx A^2 \sum_{k=-\infty}^{\infty} \chi_1(t-kT)\exp(-j2a_k\pi\Delta f)\exp(-j2\pi\Delta f_c)$$

As mentioned above, there are two cases that should be considered: a small deviation in the carrier frequency (small carrier frequency error), and a larger deviation of the carrier frequency (large carrier frequency error).

Case 1:

If $\Delta f_c$ is small (or zero), the message can be obtained by the sign of the imaginary part of the complex signal, according to the expression:

$$\Gamma(t,1) = S_{bb}(t) * S_{bb}^*(t-1) \approx A^2 \sum_{k=-\infty}^{\infty} \chi_1(t-kT)\exp(-j2a_k\pi\Delta f)$$

Case 2:

If $\Delta f_c$ is larger, the correlation coefficient for demodulation is equal to:

$$\Gamma(t,1) = S_{bb}(t) * S_{bb}^*(t-1)$$
$$\approx A^2\exp(-j2\pi\Delta f_c) \sum_{k=-\infty}^{\infty} \chi_1(t-kT)\exp(-j2a_k\pi\Delta f)$$

This correlation coefficient is equivalent to that of case 1, but with a phase rotation of $\Delta f_c$, this quantity being unknown. The correlation coefficient may be considered as a complex signal. Its state is constant during each period $T_{chip}$, the standard symbol duration or cycle of the FSK signal. The central frequency is $\Delta f_c$ with a shift of $\pm\Delta f$ according to the message. The conditions mentioned above regarding the selection of the sampling frequency ensure that the analyses of changes of the signs of the real and/or imaginary parts of this correlation coefficient enable the determination of changes in the FSK tones. The absolute phase may not present absolute information. The message may be recovered by detecting quadrant changes in the trigonometric circle, corresponding to toggling between the tones of the FSK message.

The detection section 102 may use the results of the autocorrelation, as in the first embodiment, in order to detect the start and end points of an FSK message.

For the reasons explained above, the second embodiment may provide greater robustness in the demodulation of FSK, especially when the carrier frequency may wander from the expected carrier frequency.

Third Preferred Embodiment

The third preferred embodiment is very similar to the first and second preferred embodiments. The main difference again lies in the manner in which the first and second FSK frequencies are discriminated in the complex baseband. The third embodiment uses the same circuitry and techniques as those of the first and second embodiments, except for the following differences.

In the following, the higher FSK tone is referred to as $F_h$, and the lower FSK tone is referred to as $F_l$. The separation from the carrier frequency is $\Delta f$, and the separation between the FSK tones is $2\Delta f$. The demodulation is again based on the fact that each FSK modulation frequency presents a different polarization (directional characteristic) in the complex baseband.

An autocorrelation of the signal is used to estimate the polarization. An autocorrelation means 160 is provided prior to the input of the demodulation section for applying an autocorrelation function to the signal outputted from the suppressor 20. The autocorrelation function may be represented by:

$$\Gamma\left(t, \frac{1}{F_S}\right) = S_{bb}(t) * S_{bb}^*\left(t - \frac{1}{F_S}\right)$$

where t represents time, $F_S$ the sampling frequency, $S_{bb}$ the complex signal in the complex baseband, and $S^*_{bb}$ the conjugate of $S_{bb}$.

Normalization means may be used to normalize the autocorrelation, for example, such that the demodulation has a symmetric (50%-50%) duty cycle. The algorithm used for such normalization may, for example, consist of dividing $\Gamma$ by its averaged or instantaneous norm. Alternatively, the normalization may consist of calculating the signs of the real and imaginary parts of $\Gamma$.

The autocorrelation means may comprise a filter (not shown) for filtering the autocorrelation signal to remove noise. Advantageously, an Exponential Weighted Moving Average filter may be used. An example algorithm for such a filter may be:

$$y_{k+1} = (1-\mu) \cdot y_k + \mu \cdot x_k$$

where $\mu$ is a forgetting factor between 0 and 1, $y_k$ is the output signal at instant k, and $x_k$ is the input signal at instant k. Such a filter has the advantage that the computation is relatively simple, because it only requires the previous output and the current input.

In the presence of an FSK tone, the autocorrelation signal is, in ideal conditions, proportional to:

$$\mathrm{Exp}(j \cdot 2\pi(\Delta F_c \pm \Delta f)/F_S),$$

Where "Exp" denotes an exponential function, j denotes the imaginary number, and $\Delta F_c$ represents the deviation of the carrier frequency from a nominal frequency.

When a signal of interest is present in the signal outputted from the suppressor, the autocorrelation signal is a complex signal taking one of two specific values corresponding to the two tones $F_h$ and $F_l$ and separated by $2\Delta f$. These two values are stable during the presence of each of the two tones. In a practical application, the value $\Delta f$ is between 20 KHz and 45 KHz, and the value of $F_S$ may be between 120 and 160 KHz, according to a technical specification for which the embodiment may be intended.

Figure 14:
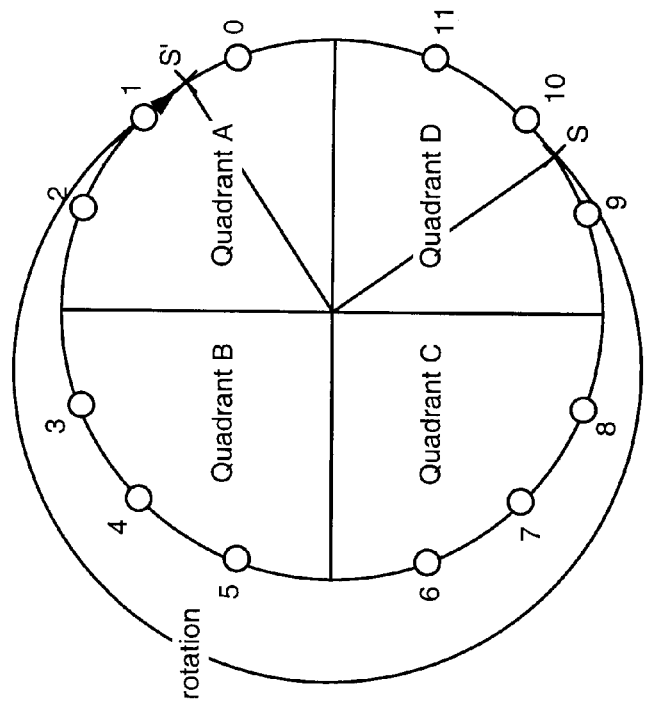
FIGS. 14A, B and C are schematic diagrams of a complex trigonometric circle showing quantization of FSK frequencies in the third embodiment.
Figure 14:
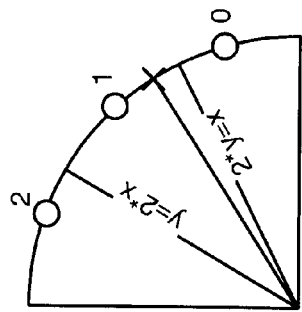
Figure 14:
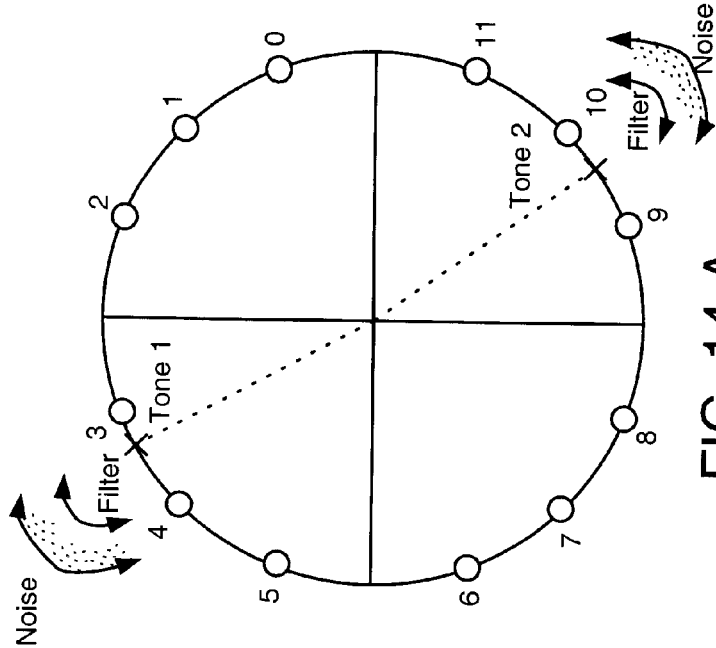

The present embodiment uses quantization based on a fixed set of points of reference. Referring to FIG. 14, N equidistant points of reference (index points) are defined around the periphery of the trigonometric circle, labeled from 0 to N−1. Each sample of the autocorrelation signal is quantized or associated to the closest one of the N points of reference. Processing is then applied to detect changes between stable tones, corresponding to the changes between $F_h$ and $F_l$; as described below. The number N of the points of reference may depend on the technical specification for which the receiver is intended. In particular, it may depend on the maximum and minimum values of $\Delta F_c$ and $\Delta f$. The detector must be able to detect changes in frequency between $F_h$ and $F_l$. The spacing between these frequencies $2\Delta f$ corresponds to an angle of $2\pi \cdot 2\Delta f/F_S$ (or $360° \cdot 2\Delta f/F_S$) in the trigonometric circle. The larger is the number N of points of reference, the easier is the discrimination of the angle. However, the complexity is reduced with a decrease of the number N of points of reference. The number N of points of reference may be chosen to provide an optimum compromise for a particular application. If the sampling frequency $F_S$ is of the order of 130 KHz, each quadrant of the trigonometric circle corresponds to a frequency band of $F_S/4=32.5$ KHz.

In the present example, $\Delta f$ is between 20 and 45 KHz. Therefore, the angle corresponding to $2\Delta f$ is from 110° to 250° in the trigonometric circle. If noise might cause the frequency of an FSK tone to oscillate between two nearest points of reference, the autocorrelation oscillates between two index (quantization) values corresponding to these two points of reference. In order to detect a real change of FSK tone, a separation of $2\Delta f$ should correspond to a spacing of more than two index values.

For technical reasons associated with the system of the preferred embodiment, it may be preferred for the number N to be a multiple of 4. A value N=8 permits the minimum separation to be detected in principle, but this value of N may not be sufficiently robust to reject noise in a noisy electrical and/or noisy signal environment. A value N=12 enables the effects of higher noise to be overcome, while still keeping a relative simple system. Therefore, in the present embodiment, the value N=12 is used (although it will be appreciated that other embodiments may use other values of N).

The quantization of the autocorrelation signal to an index value has an advantage that the index value is dimensionless. Accordingly, a system for processing the index values can be relatively simple. FIG. 14a shows an example of the trigonometric circle having 12 indexes, and illustrates two FSK tone autocorrelation signals to which the closest index is to be attributed (i.e. quantization).

The search for the index closest to the value of the autocorrelation may be performed based on a classical calculation which minimizes one of the following metrics:

$$\min_k \{\|s \cdot ref_k^*\|^2 - 1\} \text{ or}$$

$$\min_k \{|a \tan(s) - \theta_k|\}$$

where s is the complex autocorrelation signal, $ref_k^*$ is the complex conjugate of the point of reference k, $\theta_k$ is the angle of the point of reference k ($=a \tan(ref_k)$). In the following, Re(s) and Im(s) denote, respectively, the real and imaginary parts of s.

The search of the closest index may be greatly simplified by considering the process in two steps. First, the complex value of the autocorrelation signal is transformed into the quadrant of the trigonometric circle in which the real and imaginary parts are positive, namely the quadrant A in FIG. 14b. This may be achieved by determining in which quadrant A, B, C or D the complex value s is located, according to the signs of the real and imaginary parts of s. For the quadrant A, Re(s) and Im(s) are both positive. For quadrant B, Re(s) is negative, and Im(s) is positive. For quadrant C, Re(s) and Im(S) are both negative. For quadrant D, Re(S) is positive and Im(S) is negative. If necessary, a rotation of 90°, 180° or 270° is applied to bring the value s into quadrant A. The rotation of 180° may be effected simply by changing the signs of Re(s) and Im(s). The rotations of 90° and 270° may be done by switching Re(s) and Im(s) with a change of sign. Information identifying the original quadrant (prior to any rotation) is stored for use in identifying the closest index. For example, if the signal value s is initially in the quadrant D, the index value 9 may be initially stored to indicate this quadrant, because the index value is at least 9 in this quadrant (see FIG. 14b).

The second step consists of locating the closest point of reference in quadrant A for the transformed value, now called s'. The quadrant A is divided into three almost equal sectors according to the indexes, as shown in FIG. 14c. Two lines corresponding to y=2x and 2y=x are utilized in this example for delimiting these regions (where x represents Re(s') and y represents Im(s')). The location of the closest index in quadrant A is very straightforward, because it only consists of comparing $2 \cdot$Re(s') with Im(s'), and $2 \cdot$Im(s') with Re(s').

The final index is the value of that located in quadrant A added to the initially stored value. In the illustrated example, the index located in quadrant A is 1, the previously stored value is 9, and so the final value of the closest index is 10. Thus:

$$ind(s) \underset{step\,1}{=} 9 + ind(s') \underset{step\,2}{=} 9 + 1 = 10$$

where ind( ) represents the index corresponding to a point of reference closest to the complex signal.

In order to detect whether the signal corresponds to a signal of interest, it is necessary to detect whether a change between the FSK tones occurs, i.e., whether the closest index point changes (by more than two index values).

The distance between two indexes (i, j), called the circular distance, may be calculated as the number of index positions between i and j. This separation may be determined by the following formula:

$$dist(i,j)=N/2-|(i-j) \bmod N - N/2|$$

The use of the circular distance to determine changes in FSK tone enables the demodulation and/or detection of FSK to be performed in the same manner irrespective of the absolute positions of the vectors corresponding to the complex signal in the trigonometric circle. Therefore, this method enables demodulation and/or detection of FSK independently of the values of $\Delta F_c$ and $\Delta f$, in other words independently of the actual specification of the frequencies. In fact, the only limitation that might exist may be that concerning the value $2\Delta f$ which should be sufficiently big for permitting detection of a change of FSK tone.

The principle of demodulation described above is based on detecting significant changes between first and second stable index values (quantizations) irrespective of the absolute values of the index values. A determination of whether an index value is stable may be found by comparing a current value with a preceding value. If, throughout a certain period of time, the circular distance between the current index and a reference index is bigger than a predetermined threshold (set according to what is considered to be a significant change), the new index may considered to be a new stable value, and a change of FSK tone is thus detected. By detecting each significant change between stable values (i.e. different FSK tones), the FSK is demodulated.

The period of time throughout which the circular distance should be greater than the threshold may be chosen to be sufficiently long that only real FSK tone changes between stable tones are detected, and non-stable changes due to noise may be rejected. For example, the period of time may be a fraction of the period $T_{chip}$ (duration of the symbol or modulation period of the FSK). For example, if $T_{chip}$ may be 780 μs, and the sampling period may be 130 KHz, the period of time for determining a change may correspond to 30 samples. The detection of a stable index value, and a change between stable index values, may conveniently be performed by a state machine.

Figure 15:
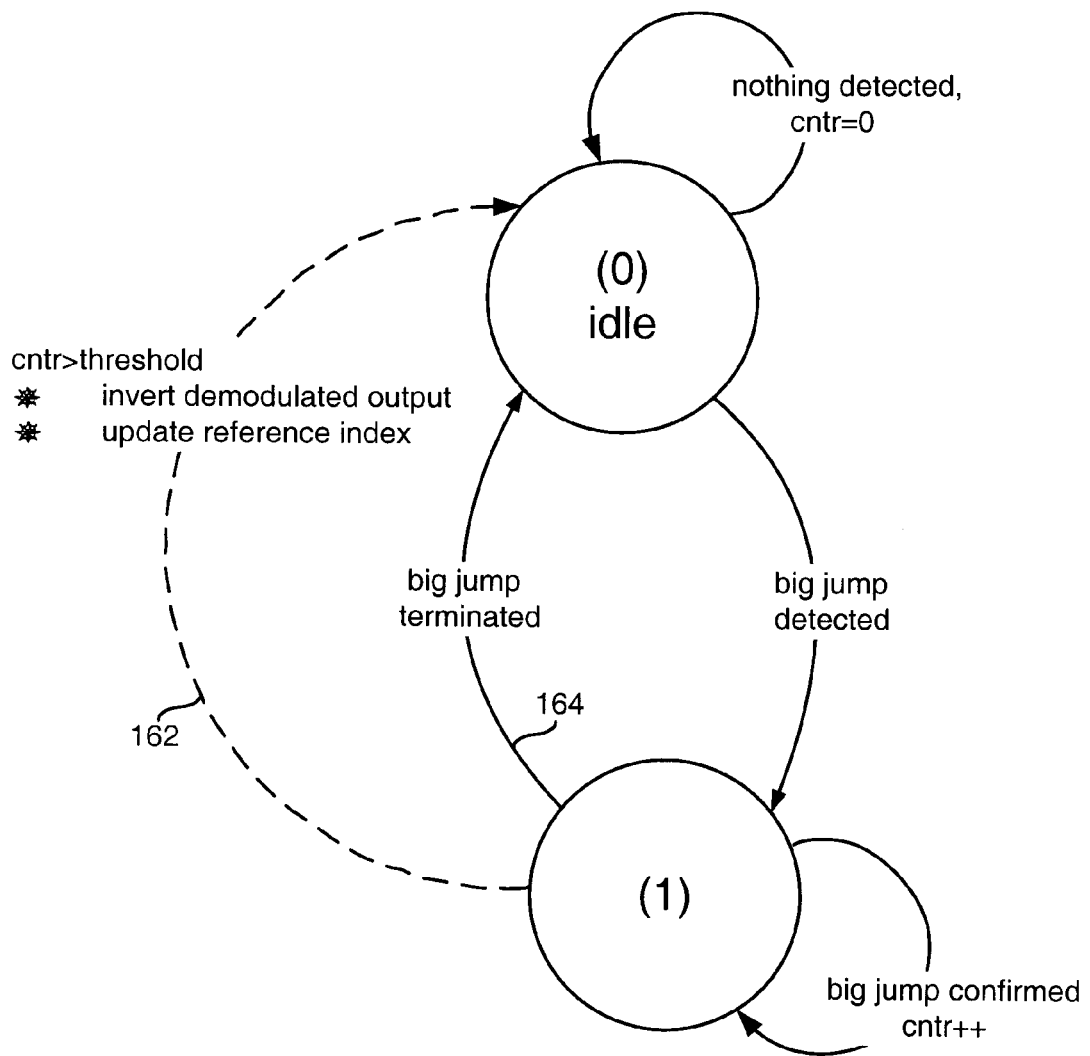
FIG. 15 is a schematic diagram illustrating the transitions of a state machine used for discriminating a jump between first and second stable frequencies, representing a change in FSK tones.

The principle of a state machine is well known to the skilled man, and so the description here is limited only to an explanation of the states, as illustrated in FIG. 15. The machine has two states 0 and 1:

State 0 represents an idle state in which no significant jump between index values has been detected. The machine remains in state 0 until a significant jump is detected, whereupon the machine transitions to state 1.

State 1 represents a state in which the duration of the significant jump is monitored to see whether the jump is to a stable value, or whether it is just a transient non-stable jump. State 1 counts the number of consecutive samples for which the jump is maintained. If the count reaches the duration corresponding to 30 samples, then the jump is considered to be a jump to a new stable index value. The machine transitions back to state 0 along a "toggle" path 162 in which the output signal is toggled to indicate detection of a change in FSK tone, and the reference index is updated to be the new stable value. The machine then remains in state 0 to detect the next significant jump. However, if while in state 1 the significant jump is not maintained (i.e. before the count reaches 30 samples), then the machine transitions back to state 0 along a termination path 164 in which the significant jump is ignored (i.e. rejected because it has not be maintained for a sufficiently long period).

The state machine therefore acts to detect transitions corresponding to toggling between stable FSK tones.

In summary, a first polarization signal at a first time t(n) is compared to a collection of fixed indexes to quantize the signal according to the index values. A second polarization signal at a second time t(n+i) is similarly quantized, where i is an integer representing a period of time between t(n) and t(n+i). The separation or circular distance between the first and second indexes is calculated. The circular distance is compared to a first threshold to detect whether a circular distance corresponds to a change in frequency between two stables FSK tones. A second time threshold may also be applied to reject significant jumps that are not between stable index values.

As illustrated in all the preferred embodiments, the invention can provide techniques for simple, yet highly effective suppression of coherent interference in a received signal, by switching between adaptive and non-adaptive filter modes in dependence of the presence of a signal of interest. The invention can also provide techniques for efficient processing of an FSK signal in a complex baseband, and for non-coherent detection, classification and demodulation of an FSK signal, without requiring high computational load. When used together, synergistic advantages include the ability to provide robust FSK processing which can be immune to interference components, even coherent interference components close to the FSK frequencies, and high detection of FSK signals that themselves may be of poor tolerance, and include significant frequency deviations with respect to an optimum signal.

The invention claimed is:

1. An apparatus for suppressing interference in a received communications signal, comprising:
an adaptive filter configured to remove components from said received communications signal, said adaptive filter being operable in a first adaptive mode to adapt to changes in said received communications signal, and in a second mode having an at least reduced adaptability compared to said first mode, wherein said adaptive filter receives said communications signal as a first input, and a delayed communications signal as a second reference input, wherein said delayed communications signal comprises a noise reference derived from said communications signal; and
a control circuit configured to control the mode of said adaptive filter in dependence on whether said received communications signal contains a signal of interest, wherein (A) said control circuit comprises a detector configured to detect the presence of said signal of interest in said received communications signal, (B) said detector comprises (i) a first detection section configured to detect the presence of a coherent component in said received communications signal, and (ii) a classification section configured to classify whether said detected coherent component is said signal of interest and (C) said control circuit is configured, responsive to detection of said coherent component by said first detection section, to (i) generate a control signal to set said adaptive filter to said second mode, (ii) generate a control signal to keep said adaptive filter in said second mode if said coherent component is classified as being said signal of interest and (iii) generate a control signal to set said adaptive filter to said first adaptive mode if said coherent component is classified as not being said signal of interest.

2. The apparatus according to claim 1, wherein said second mode of said adaptive filter is a non-adaptive mode, in which filter taps do not adapt to changes in said received communications signal.

3. The apparatus according to claim 1, wherein said control circuit is configured to set said filter to said second mode when said received communications signal contains said signal of interest.

4. The apparatus according to claim 1, wherein said control circuit is configured to set said filter to said first adaptive mode in the absence of said signal of interest in said received communications signal.

5. The apparatus according to claim 1, wherein said adaptive filter (i) comprises a Wiener filter, (ii) receives said communications signal as a first input, and (iii) receives said delayed communications signal as a second reference input.

6. The apparatus according to claim 1, wherein said adaptive filter comprises at least one finite impulse response filter.

7. The apparatus according to claim 6, wherein said adaptive filter comprises first and second finite impulse response filters coupled in a series-parallel arrangement.

8. The apparatus according to claim 1, wherein said detector has a response time less than an adaptation time of said adaptive filter when in said first adaptive mode.

9. The apparatus according to claim 1, wherein said detector is downstream of said adaptive filter, and is configured to detect the presence of said signal of interest in said received communications signal after filtering by said adaptive filter.

10. The apparatus according to claim 1, wherein said detector comprises:
   a first detection section configured to detect the presence of a coherent component in said received communications signal; and
   a second classification section configured to classify whether said detected coherent component is said signal of interest.

11. The apparatus according to claim 10, wherein said control circuit is configured, responsive to detection of said coherent component by said first detection section, to:
   (i) generate a control signal to set said adaptive filter to said second mode;
   (ii) generate a control signal to keep said adaptive filter in said second mode if said coherent component is classified as being said signal of interest; and
   (iii) generate a control signal to set said adaptive filter to said first adaptive mode if said coherent component is classified as not being said signal of interest.

12. The apparatus according to claim 10, wherein said second classification section is configured to detect the presence of at least one characteristic indicative of frequency shift keying.

13. The apparatus according to claim 1, further comprising a frequency converter configured to convert said received electronic communications signal to a complex baseband signal in which a first FSK component is represented as a first complex signal and a second FSK component is represented as a second complex signal.

14. The apparatus according to claim 13, wherein said frequency converter is upstream of said adaptive filter.

15. The apparatus according to claim 13, further comprising a discriminator for discriminating between said first and second complex signals, and for generating a signal for distinguishing a change of FSK frequency component.

16. The apparatus according to claim 15, wherein said discriminator is downstream of said adaptive filter.

17. The apparatus according to claim 15, further comprising an autocorrelator configured to (i) estimate a characteristic of said complex signal in said complex baseband, (ii) apply a weighted average to the result of the autocorrelation and (iii) normalize said autocorrelation.

18. The apparatus according to claim 15, wherein the discriminator is responsive to a directional characteristic of a vector representing said complex signal in complex space.

19. The apparatus according to claim 18, wherein said directional characteristic is a quantized angle of said vector.

20. The apparatus according to claim 19, wherein said quantization is based on a quantization unit of 360 degrees divided by N, where N is an integer greater than 1.

21. The apparatus according to claim 20, wherein said quantization unit is 180 degrees.

22. The apparatus according to claim 20, wherein said quantization unit corresponds to a sign of an imaginary part of said vector.

23. The apparatus according to claim 15, wherein said discrimination is performed using a sign of an imaginary part of said complex signal.

24. The apparatus according to claim 20, wherein said quantization unit is 90 degrees.

25. The apparatus according to claim 24, wherein said quantization unit corresponds to signs of real and imaginary parts of said vector.

26. The apparatus according to claim 24, wherein said quantization unit is less than 90 degrees.

27. The apparatus according to claim 1, implemented as a digital circuit for processing samples of said received communications signal.

28. The apparatus according to claim 1, implemented within a communications signal receiver.

29. The apparatus according to claim 1, implemented within a receiver of a remote control system.

30. An apparatus for suppressing interference in a received communications signal, comprising:
   an adaptive filter configured to remove components from said received communications signal, said adaptive filter being operable in a first adaptive mode to adapt to changes in said received communications signal, and in a second mode having an at least reduced adaptability compared to said first mode, wherein said adaptive filter receives said communications signal as a first input, and a delayed communications signal as a second reference input, wherein said delayed communications signal comprises a noise reference derived from said communications signal;
   a control circuit configured to control the mode of said adaptive filter in dependence on whether said received communications signal contains a signal of interest, wherein said control circuit comprises a detector configured to detect the presence of said signal of interest in said received communications signal, and
   a discriminator configured to assign one of a plurality of N predetermined index values to a directional characteristic of said complex signal, to quantize a directional characteristic of said signal.

31. The apparatus according to claim 30, wherein the discriminator is configured to:
   (a) determine whether real and imaginary parts of said complex signal are both positive and, if not, then to apply a transform to said complex signal into a quadrant of complex space in which said real and imaginary parts are both positive; and
   (b) assign an index value with respect to said positive real and imaginary parts of said complex signal.

32. The apparatus according to claim 30, wherein the discriminator is configured to detect an occurrence of a change in index value greater than a predetermined threshold difference magnitude.

33. The apparatus according to claim 32, wherein the discriminator is configured to identify a change in index value between a first stable value and a second stable value.

34. A method of suppressing interference in a received communications signal, said method comprising:
   filtering said received communications signal to remove components therefrom using an adaptive filter controllable in a first adaptive mode in which adaptive filter taps adapt to changes in the received communications signal, and a second mode having an at least reduced adaptability compared to said first mode, wherein said second mode of said filter is a non-adaptive mode in which said filter taps do not adapt to changes in said received communications signal, wherein said adaptive filter receives (i) said communications signal as a first input and (ii) a delayed communications signal derived from said received communications signal as a second reference input;

controlling said mode of said adaptive filter in dependence on whether said received communications signal contains a signal of interest, wherein the step of controlling comprises (i) selecting said first mode when no signal of interest is detected in said received communications signal, (ii) selecting said second mode when said signal of interest is detected in said received communication signal, and (iii) detecting a presence of said signal of interest in said received communications signal after the step of filtering; and discriminating between a first FSK component and a second FSK component using a directional characteristic of a vector representing said complex signal in complex space, wherein (A) said directional characteristic is a quantized angle of said vector, (B) said quantization is based on a quantization unit of 360 degrees divided by N, where N is an integer greater than 1, (C) the step of discriminating comprises detecting a change in said quantized angle of said vector, and (D) said change is compared to a threshold greater than 2 to determine whether or not said change is a candidate to represent a change in FSK component frequency.

35. The method according to claim 34, wherein said signal of interest is a frequency shift keyed signal.

36. The method according to claim 35, further comprising a step of converting said received communications signal to a complex baseband in which a first FSK component frequency is represented as a first complex signal, and a second FSK component frequency is represented as a second complex signal.

* * * * *